(12) United States Patent
An et al.

(10) Patent No.: US 12,416,472 B1
(45) Date of Patent: Sep. 16, 2025

(54) HUMAN DETECTION AND WARNING METHOD, SIGHTING DEVICE AND COMPUTER-READABLE STORAGE MEDIUM

(71) Applicant: Raytron Technology Co., Ltd., Yantai (CN)

(72) Inventors: Jiwen An, Hefei (CN); Yang Chen, Hefei (CN); Zhongyin Liu, Hefei (CN); Hao Wang, Hefei (CN); Yinli Jiang, Hefei (CN)

(73) Assignee: RAYTRON TECHNOLOGY CO., LTD., Yantai (CN)

( * ) Notice: Subject to any disclaimer, the term of this patent is extended or adjusted under 35 U.S.C. 154(b) by 0 days.

(21) Appl. No.: 18/922,452

(22) Filed: Oct. 22, 2024

(30) Foreign Application Priority Data

| May 11, 2024 | (CN) | 202410580971.1 |
| May 21, 2024 | (CN) | 202410633384.4 |
| May 28, 2024 | (CN) | 202410667733.4 |

(51) Int. Cl.
| *F41G 3/16* | (2006.01) |
| *G06V 10/75* | (2022.01) |
| *G06V 20/52* | (2022.01) |
| *G06V 40/10* | (2022.01) |
| *G08B 21/02* | (2006.01) |

(52) U.S. Cl.
CPC ........... *F41G 3/165* (2013.01); *G06V 10/751* (2022.01); *G06V 20/52* (2022.01); *G06V 40/10* (2022.01); *G08B 21/02* (2013.01); *G06V 2201/07* (2022.01)

(58) Field of Classification Search
CPC ...... F41G 3/165; G06V 10/751; G06V 20/52; G06V 40/10; G06V 2201/07; G08B 21/02
See application file for complete search history.

(56) References Cited

U.S. PATENT DOCUMENTS

| 2006/0225335 A1 | 10/2006 | Florence |
| 2014/0028856 A1 | 1/2014 | Ehrlich |
| 2017/0176127 A1* | 6/2017 | Ferris .................... A63F 13/537 |

(Continued)

FOREIGN PATENT DOCUMENTS

| AU | 2010352530 A1 * | 4/2012 | .............. F41G 11/00 |
| AU | 2014217479 A1 * | 10/2015 | .............. F41A 19/58 |

(Continued)

OTHER PUBLICATIONS

Extended European Search Report of EP patent application No. 24209288.0 issued on Apr. 29, 2025.

(Continued)

*Primary Examiner* — Tuyen K Vo
(74) *Attorney, Agent, or Firm* — Andrew C. Cheng

(57) ABSTRACT

A human detection and warning method includes: acquiring a current scene image within a current field of view of a sighting device; determining whether there is a human target being currently aimed at and/or whether there is currently target tracking of a human target, based on a target recognition result of the current scene image and a position of an aiming mark in the current scene image; and triggering the sighting device to enter an abnormal aiming mode if there is a human target being currently aimed at and/or there is currently target tracking of a human target.

10 Claims, 13 Drawing Sheets

(56) References Cited

U.S. PATENT DOCUMENTS

2022/0334793 A1* 10/2022 Mariano ................ H04R 1/403
2025/0102255 A1* 3/2025 Allan ...................... F41A 17/54

FOREIGN PATENT DOCUMENTS

| | | | | |
|---|---|---|---|---|
| CA | 2830087 | A1 * | 1/2013 | ............... F41G 1/38 |
| CA | 3072084 | A1 * | 2/2019 | ............... F41G 1/38 |
| CN | 110414313 | A | 11/2019 | |
| CN | 111012301 | A | 4/2020 | |
| CN | 111427387 | A | 7/2020 | |
| CN | 114459281 | A | 5/2022 | |
| CN | 115930682 | A | 4/2023 | |
| CN | 117877124 | A | 4/2024 | |
| WO | 2023155357 | A1 | 8/2023 | |

OTHER PUBLICATIONS

The first search report of CN patent application No. 2024105809711 issued on Jun. 17, 2024.

\* cited by examiner

HUMAN DETECTION AND WARNING METHOD, SIGHTING DEVICE AND COMPUTER-READABLE STORAGE MEDIUM

CROSS-REFERENCE TO RELATED APPLICATIONS

The present application claims the priorities of China Patent Application No. 202410580971.1 filed on May 11, 2024, China Patent Application No. 202410633384.4 filed on May 21, 2024, and China Patent Application No. 202410667733.4 filed on May 28, 2024, the entire contents of which are incorporated herein by reference.

TECHNICAL FIELD

This application relates generally to sighting devices and, in particular, to a human detection and warning method, a sighting device, and a computer-readable storage medium.

BACKGROUND

The wide spread and gradual popularization of hunting in different regions all over the world lead to constant pursuit for the performance of shooting equipment, particularly lead to a significant increase in the requirement for shooting accuracy. Sighting devices, as an important component for improving the shooting accuracy of hunting and shooting equipment, can assist shooters in accurately aiming at a target in a real-time image, thus greatly improving the operation ability of the shooters.

Therefore, the development and application of sighting devices are of great importance for improving the user experience of hunting and shooting equipment. One of the major breakthroughs in the sighting devices is the development and application of infrared scopes, which can usually collect thermal radiation emitted by a target object and convert the collected thermal radiation into a visual image to allow for shooting under low-light conditions, thus providing the shooters with a good hunting experience in various environments.

However, the inventor of the application has found in his research that all existing sighting devices are developed and applied to help shooters aim at targets in various application scenarios and neglect the safety of hunting and shooting equipment in use, and especially in some dark or unforeseen circumstances, other people may be shot or hurt mistakenly. By improving both the shooting accuracy and safety of the sighting device and adding the sighting device to the shooting equipment, such as guns, the shooting equipment can be limited only to civilian use such as hunting, and cannot support for military use. Adding such sighting devices can also provide a safety warning function to the civilian shooting equipment that originally do not have such safety warning function, which is of great significance for improving the safety of the shooting equipment in use.

SUMMARY

The present disclosure is directed to a human detection and warning method, a sighting device, and a computer-readable storage medium that can effectively improve the safety of using a shooting device and can avoid accidentally shooting others.

In one aspect, a human detection and warning method is provided which includes: acquiring a current scene image within a current field of view of a sighting device; determining whether there is a human target being currently aimed at and/or whether there is currently target tracking of a human target, based on a target recognition result of the current scene image and a position of an aiming mark in the current scene image; and triggering the sighting device to enter an abnormal aiming mode if there is a human target being currently aimed at and/or there is currently target tracking of a human target.

In some embodiments, determining whether there is a human target being currently aimed at and/or whether there is currently target tracking of a human target based on the target recognition result of the current scene image and the position of the aiming mark, comprises: performing target recognition with respect to the current scene image to determine a human target contained in the current scene image and mark the human target; determining the position of the aiming mark in the current scene image; determining whether the human target is currently being aimed at based on a position of a marking of the human target being marked and the position of the aiming mark in the current scene image.

In some embodiments, marking the human target comprises: displaying a target frame at a periphery of the human target; and/or highlighting an outline or an image area of the human target, the way of highlighting comprising at least one of the following: highlighting in specified color, outlined highlighting, highlighting with higher brightness.

In some embodiments, determining whether there is a human target being currently aimed at and/or whether there is target tracking of a human target based on the target recognition result of the current scene image and the position of the aiming mark, comprises: determining a position of the aiming mark in the current scene image, and performing target recognition with respect to a predetermined area image corresponding to the position of the aiming mark; determining, based on the target recognition with respect to the predetermined area image, whether there is a human target present within the predetermined area image corresponding to the position of the aiming mark to determine whether there is a human target being currently aimed at.

In some embodiments, the target recognition is a deep learning-based target recognition method, comprises: utilizing a target detection model to determine whether there is a target present in the current scene image; if a target exists in the current scene image, extracting features of the current target using a feature extraction model to obtain a target feature vector of the current target; and comparing the target feature vector with a human feature vector in a human feature vector database to determine whether the current target is a human target, wherein the human feature vector has been obtained by inputting a sample image containing a human target into the feature extraction model.

In some embodiments, the abnormal aiming mode comprises at least one of the following:
 providing a warning notice, the warning notice comprising at least one of an audible warning, a light warning, a graphic warning on a display screen, and a target highlighting warning; providing an abnormal display warning, the abnormal display comprising at least one of disappearing of an aiming mark, offsetting of an aiming mark, a black screen, a splash screen, and jittering of a display screen; shutdown of a system; providing a warning notice and starting a timer, and providing an abnormal display warning or shutting down the system if the accumulated time of the timer reaches a threshold and there is still a human target being currently aimed at; and issuing a shoot-locking instruction, the shoot-locking instruction being used to control a trigger locking member mounted on shooting equipment to lock a trigger of the shooting equipment.

In some embodiments, the method further includes: maintaining or restoring a normal aiming mode of the sighting device if there is no human target being currently aimed at and/or there is no target tracking of a human target; or resuming a normal aiming mode if a control instruction to manually revoke the abnormal aiming mode is received.

In some embodiments, the current scene image is one of an infrared image, a visible light image, a micro-light image, and a multi-light fusion image.

In some embodiments, determining whether there is a human target being currently aimed at and/or whether there is currently target tracking of a human target, comprises: determining a human target contained in the current scene image based on target recognition with respect to the current scene image; determining whether there is currently target tracking of the human target based on a change in relative position between the human target and the aiming mark during a set time period.

In some embodiments, determining whether there is currently target tracking of the human target based on the change in relative position between the human target and the aiming mark during the set time period, comprises at least one of the following: determining whether the human target is considered to fast approach the aiming mark and has reached a preset range of the aiming mark, based on a trend of change in the relative position between the human target and the aiming mark in the current scene image during the set time period or within a consecutive preset number of frames, to determine whether there is currently target tracking of the human target; determining whether the human target remains in a preset range of the aiming mark within a preset time threshold, based on the relative position between the human target and the aiming mark in the current scene image during the set time period or within a consecutive preset number of frames, to determine whether there is currently target tracking of the human target; and determining whether the human target is considered to fast approach the aiming mark, has reached a preset range of the aiming mark, and remains in a preset range of the aiming mark within a preset time threshold, based on the relative position between the human target and the aiming mark in the current scene image during the set time period or within a consecutive preset number of frames, to determine whether there is currently target tracking of the human target.

In some embodiments, before determining whether there is currently target tracking of a human target, the method further comprises: determining whether the human target is considered to fast approach the aiming mark based on a trend of change in the relative position between the human target and the aiming mark in the current scene image during the set time period or in the consecutive preset number of frames; and issuing a warning notice of paying attention to the human target if the human target is considered to fast approach the aiming mark and has reached the preset range of the aiming mark, and the human target does not meet the condition of remaining within a preset range of the aiming mark within a preset time threshold, or if the human target is considered to fast approach the aiming mark but has not reached the preset range of the aiming mark; wherein issuing the warning notice of paying attention to the human target comprises: displaying on a display screen a warning message that a human target is currently approaching; and/or highlighting on a display screen a periphery, outline or image area of the human target determined to be fast approaching with a marking distinguishable it from other targets.

In some embodiments, determining whether there is a human target being currently aimed at and/or whether there is currently target tracking of a human target, comprises: performing target recognition within a preset range of the aiming mark based on the position of the aiming mark in the current scene image; determining, based on the target recognition, whether a human target is contained within the preset range; if a human target is contained within the preset range, determining whether there is target tracking of the human target by determining whether the human target is contained within the preset range in the current scene image during a set time period or for each of a consecutive preset number of frames.

In some embodiments, before determining whether there is a human target being currently aimed at and/or whether there is currently target tracking of a human target, the method further comprises: if it is determined that a human target is contained in the current scene image based on the target recognition result of the current scene image, highlighting the human target in a different way from other aiming targets.

In another aspect, a sighting device includes a memory for storing a computer program therein; a processor configured to execute the computer program to implement a human detection and warning method as described above; an image sensor configured to capture a current scene image within a current field of view; and a display module configured to display the current scene image and the aiming mark.

In still another aspect, a computer-readable storage medium has a computer program stored thereon, the computer program being executable by a processor to implement a human detection and warning method as described above.

In the human detection and warning method provided in the above embodiments, based on the target recognition result with respect to the current scene image obtained in real time within the current field of view of the sighting device and the position of the aiming mark, it is determined whether the sighting device is currently aiming at a human target and/or whether there is currently target tracking of the human target during the aiming process. If it is determined that there is currently a human target being currently aimed at and/or there is currently target tracking of the human target, the sighting device is triggered to enter an abnormal aiming mode, and the user of the shooting equipment is warned through the abnormal aiming mode that the shooting is currently not allowed. In this way, it can effectively avoid accidental shooting or injury to others in some cases of insufficient illumination or unforeseeable circumstances, and improve the safety of using shooting equipment. By being mounted with the sighting device with the human detection and warning function, any shooting equipment such as guns can limit its applicable scenes to civilian scenes, such as hunting, and cannot be used in the military scene or scenes not allowed by law, thereby effectively enhancing the safety of using shooting equipment. It should be noted that the sighting device can be added as an accessory to the shooting equipment, so that any shooting equipment that originally does not have safety warning function can be provided with the safety warning function by adding the sighting device provided by embodiments of the present application, which has good adaptability and practicality.

In the above embodiments, the sighting device and the computer-readable storage medium belong to the same concept as the corresponding human detection and warning method, and thus have the same technical effect as the human detection and warning method, which are not repeated herein.

DESCRIPTION OF THE EMBODIMENTS

The technical solutions of this application are described in further detail below in conjunction with accompanying drawings and specific embodiments.

To better clarify the purposes, technical solutions and advantages of the application, the application will be described in further detail below in conjunction with accompanying drawings. The embodiments in the following description should not be construed as limitations of the application, and all other embodiments obtained by those ordinarily skilled in the art without creative labor should also fall within the protection scope of the application.

The expression "some embodiments" in the following description should be interpreted as a subset of all possible embodiments. It should be noted that "some embodiments" may be identical or different subsets of all possible embodiments, and these subsets may be combined on the premise of no conflicting with each other.

Terms "first", "second" and "third" in the following description are merely used for distinguishing similar items and do not indicate a specific sequence of the items. It can be understood that specific sequences defined by "first", "second" and "third" may be changed where permitted to allow the embodiments of the application described here to be implemented in other sequences different from those illustrated or described herein.

Before the embodiments of the application are described in further detail, terms involved in the embodiments of the application are explained as follows.

Sighting device: the sighting device refers to a tool that is mounted on the shooting equipment to help shooters accurately observe and sight a target. The sighting device generally comprises an image sensor and a display module, wherein the image sensor is used to acquire a scene image within a current field of view, and the display module is used to display the scene image and an aiming mark. The sighting device is typically a stand-along sighting tool and may be mounted on shooting equipment for use. Of course, the sighting device may be part of the shooting equipment that is integrated and preinstalled on the shooting equipment before delivery of the shooting equipment, that is, the shooting equipment itself has a sighting function and is provided with an image sensor and a display module. In the application, the sighting device may be a stand-alone sighting tool or one that is integrated on shooting equipment, and the application has no limitation in this aspect.

Aiming mark: the aiming mark refers to any mark that is displayed in an image of the sighting device for indicating a currently aimed position, such as, for example, a reticle, an aiming cursor or an aiming red dot. When the aiming mark is positioned on a target in the scene image, it indicates that shooting equipment aims at the target.

Figure 1:
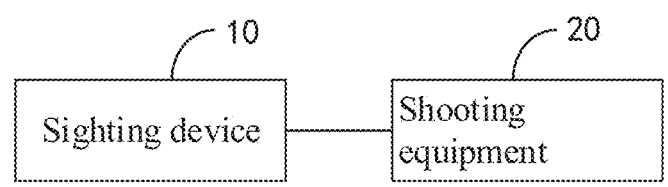
FIG. 1 shows an exemplary application scenario of a human detection warning method according to one embodiment.

FIG. 1 illustrates a possible application scenario for a human detection and warning method in accordance with an embodiment of the present application, which includes a sighting device 10 and shooting equipment 20, and the sighting device 10 is designed as a separate and independent accessory with respect to the shooting equipment 20. The sighting device 10 includes an image sensor, a display module, a memory, and a processor, and can be aftermarket installed on the shooting equipment 20. The sighting device 10 is loaded with a computer program for executing the human detection and warning method according to the embodiment of the present application, so as to provide the shooting equipment 20 with a human target detection and warning function during shooting activities.

Alternatively, the sighting device 10 may also be integrated on the shooting equipment 20 before the shooting equipment 20 is shipped from the factory. To users of the shooting equipment 20, the sighting device 10 is pre-installed on the shooting equipment 20, but this situation also belongs to the case where the sighting device 10 is added as an accessory to the shooting equipment 20, to add the human detection and warning function to the shooting equipment which originally does not have the safety warning function.

Figure 2:
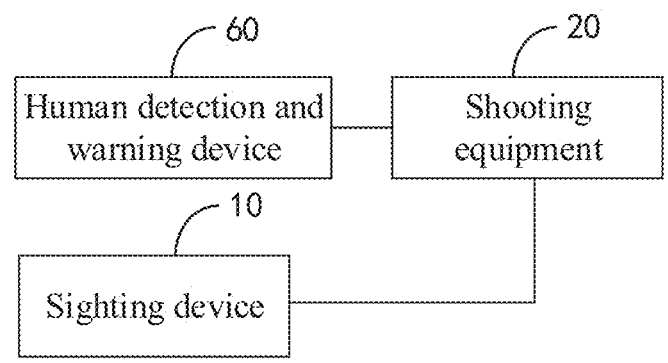
FIG. 2 shows another exemplary application scenario of a human detection and warning method according to one embodiment.

FIG. 2 illustrates another possible application scenario for the human detection and warning method in accordance with another embodiment of the present application, which includes a separate human detection and warning device 60 loaded with a computer program for executing the human detection and warning method according to this embodiment. Specifically, the human detection and warning device 60 includes a memory and a processor. In this case, the human detection and warning device 60 can be formed as an accessary independent from the known sighting device 10. The human detection and warning device 60 can be pre-installed or aftermarket installed on the shooting equipment 20, so as to add the human detection and warning function to the shooting equipment which originally do not have the safety warning function.

Alternatively, the shooting equipment 20 can include a processor and a memory for storing and executing a computer program to perform the human detection and warning method, so as to add the human detection and warning function to the shooting equipment 20.

It should be noted that, in the following embodiments, the human detection and warning method is mainly illustrated as being applied in the sighting device (i.e., the sighting device is the one who performs the method) by way of example, and the sighting device is an independent observation and sighting tool that can be aftermarket installed on the shooting equipment for use, but these examples should not be used to limit the present application.

The sighting device 10 is installed on the shooting equipment 20, and is utilized to execute the computer program to perform the human detection and warning method, so as to provide the shooting equipment 20 with the human detection and warning function during the shooting activity. The method for realizing this design concept mainly includes: obtaining a current scene image within a current field of view of the sighting device; determining whether there is a human target currently being aimed at or there is currently target tracking of a human target based on a target recognition result of the current scene image and a position of an aiming mark in the current scene image; triggering the sighting device into an abnormal aiming mode if it is determined that there is a human target currently being aimed at or there is currently target tracking of a human target.

That is to say, the human detection and warning method of the present application can be implemented in three different ways. In a first way, it is only determined whether there is a human target currently being aimed at and, if yes, the sighting device is triggered into the abnormal aiming mode. In a second way, it is only determined whether there is currently target tracking of a human target and, if yes, the sighting device is triggered into the abnormal aiming mode. In a third way, it is jointly determined whether there is a human target currently being aimed at and whether there is currently target tracking of a human target and, if yes, the sighting device is triggered into the abnormal aiming mode. In the following, the above three different ways are discussed in conjunction with specific embodiments.

Figure 3:
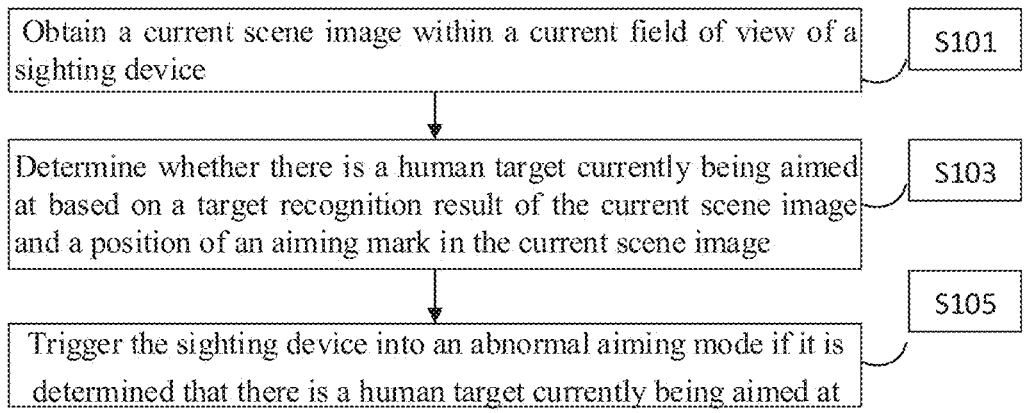
FIG. 3 shows a flowchart of a human detection and warning method according to one embodiment.

FIG. 3 illustrates an exemplary embodiment of a human detection and warning method, in which entry into an abnormal aiming mode is triggered by the detection of a human target currently being aimed at. The human detection and warning method provided in this embodiment includes:

S101, obtaining a current scene image within a current field of view of a sighting device;

S103, determining whether there is a human target currently being aimed at based on a target recognition result of the current scene image and a position of an aiming mark in the current scene image;

S105, triggering the sighting device into an abnormal aiming mode if it is determined that there is a human target currently being aimed at.

The current scene image refers to the image formed in real time for the current field of view of the sighting device during use. A target refers to an object of interest for image detection in the current scene image, and in embodiments of this application, targets are categorized into an aiming target and a human target. For example, in a hunting scene, the aiming target mainly includes various prey in the hunting scene image. The human target refers to a human body or any part thereof contained in the current scene image.

The abnormal aiming mode refers to another working mode as opposed to a normal aiming mode of the sighting device, which is used to warn the user of the shooting equipment that the user currently cannot shoot by interrupting the normal aiming function of the sighting device.

Target recognition may be carried out by various known methods of image detection to recognize the type and location of a specified target in the image. The human detection and warning method provided by embodiments of the present application may be applied to the sighting device, and specifically may be implemented by a processor within the sighting device by executing a computer program. In the process of performing the human detection and warning method by the sighting device, the human target is taken as one of the objects of interest for image detection in the current scene image, and when it is determined that the shooting equipment is aiming at a human target based on the target recognition result of the current scene image and the position of the aiming mark in the current scene image, the sighting device is triggered to automatically enter the abnormal aiming mode. In this way, the user of the shooting equipment is prompted through the abnormal aiming mode that shooting is currently not allowable, which can effectively avoid accidental shooting or injuring others in some cases of insufficient illumination or unforeseeable circumstances, thereby improving the safety of using the civilian shooting equipment.

It should be noted that, in the use of civilian shooting equipment, due to the complexity of various use scenarios, there may be a variety of unavoidable situations where people appear in the field of view being imaged. For example, in a situation where wolves and shepherds are interspersed with sheep on a pasture, due to the wolf's movement characteristics, the field of view being imaged of the sighting device needs to be large to obtain a current scene image that covers as much image information as possible, so as to analyze and predict the movement characteristics of wolves within the field of view being imaged. In this case, the image of the shepherds may also appear in the corresponding current scene image. With the sighting device installed on the shooting equipment, the human detection and warning method can be performed to calculate to determine in real time whether the shooting equipment is currently aiming at a human target with respect to the current scene image in the current field of view; in the case of a human target currently being aimed at, the sighting device will be triggered automatically to enter the abnormal aiming mode to alert the user to quickly switch the aiming target; and in the case of no human target being currently aimed at, the sighting device can keep the normal aiming mode to assist the user to aim at the wolf that the user originally desires to aim at.

For another example, on the shooting training ground, shooting equipment such as bows and arrows or shooting training guns can also be installed with a sighting device to assist in aiming at the shooting target. With the human detection and warning method performed by the sighting device, a calculation can be made with respect to the current scene image in the current field of view to determine in real time whether the shooting equipment is currently aiming at a human target. If it is determined that there is a human target being currently misaimed at, the sighting device will be triggered automatically to enter the abnormal aiming mode to notify the user to quickly switch the aiming target, ensuring the safety during the training course.

For those shooting equipment originally having no limitation in its application scenarios imposed thereon, by installing the sighting device on them, their applicable scenarios can be limited to only civilian scenarios such as hunting, making the shooting equipment unable to use in the military scenario, thus effectively enhancing the safety of using the shooting equipment.

In various embodiments, the sighting device loaded with the computer program for executing the human detection and warning method in accordance with the embodiments of the present application may be one of various image-based sighting devices, such as an infrared sight, a visible light sight, a micro-light sight, or a dual-light fusion sight, etc., and accordingly, the current scene image may be to an infrared image, a visible light image, a micro-light image, or a multi-light fusion image. Especially for the infrared sight, it can significantly improve the night-time shooting capability of the shooting equipment; however, safety risk may arise in a complex hunting scene or a shooting scene where a human target may appear, especially if the illumination is insufficient. By loading and executing the computer program to perform the human detection and warning method provided by embodiments of the present application, the aiming image can be analyzed in real time to timely recognize whether a human target is currently being aimed at, and a clear warning signal can be issued or even the continued use of the aiming function can be directly restricted if it is determined that a human target is currently being aimed at, thus providing the users of the civilian shooting equipment with greater capability in perceiving the surrounding environment, and greatly reducing the probability of accidents.

In some embodiments, step S103 includes:
performing target recognition with respect to the current scene image to determine a human target contained in the current scene image and mark the human target;
determining a position of the aiming mark in the current scene image; and
determining whether the human target is currently being aimed at target based on a position of a mark of the human target and the position of the aiming mark in the current scene image.

The target recognition may involve a global target detection and recognition with respect to the current scene image to recognize and mark all human targets contained in the current scene image. At the same time, based on the position of the aiming mark in the current scene image, it is determined whether the position of the aiming mark overlaps the position of any one of the human targets that have been marked, and it is thereby further determined whether a human target is being currently aimed at.

It is to be noted that, in the aiming process, the sighting device also determines, based on a target recognition with respect to the current scene image, the aiming target contained in the current scene image, such as the types of various animals in the hunting scene and their positions in the image, so as to assist the user to aim at the aiming target that is desired to be tracked through the aiming mark. The detection of the aiming target is achieved by target recognition which performs a global detection with respect to the current scene image. In this embodiment, the human target may be considered as one of the target types of the target recognition, and determining the human target can be performed at the same step with detecting and recognizing the aiming target by means of the target recognition, but the human target contained in the image may be marked in a way different from the aiming target to provide more noticeable prompt.

In one embodiment, marking the human target includes:
displaying a target frame around a periphery of the human target; and/or
highlighting an outline or an image area of the human target, the way of highlighting including at least one of the following: highlighting in specified color, outlined highlighting, highlighting with higher brightness.

The target frame may be based on an anchor frame adopted by the target recognition program for image detection and recognition, and directly determining the target frame based on the position of the anchor frame is conducive to simplifying the algorithm. The target frame may be, but is not limited to, a rectangle, an oval, or of other shapes, and completely contains the recognized human target therein. As such, it can be determined whether the position of the aiming mark falls within the target frame, and if it falls in any of the target frames, it can be determined that the shooting equipment is currently aiming at the human target.

Highlighting the outline or the image area of the human target may be achieved by, after image detection and recognition to determine the type and position of the target by means of target recognition, extracting the outline of an image area where the human target is located to determine the outline or image area of the human target, and highlighting the outline or the image area of the human target. It is to be noted that, on the premise of not conflicting with each other, two or more of these highlighting methods may be used in combination to enhance the highlighting effect.

In the above embodiment, the target recognition method involving the global target detection and recognition with respect to the current scene image makes it possible for the detection of the aiming target by the sighting device to assist in enhancing the accuracy of the shooting and the detection of the human target to assist in enhancing the safety of the shooting to be integrated in the same step, so as to enhance the real-time capability.

In some embodiments, step S103 includes:
determining a position of an aiming mark in the current scene image, and performing target recognition with respect to a predetermined area image corresponding to the position of the aiming mark; and
determining, based on the target recognition, whether there is a human target within the predetermined area image corresponding to the position of the aiming mark to thereby determine whether there is a human target currently being aimed at.

In this embodiment, in the process of determining whether a human target is being currently aimed at, the position of the aiming mark in the current scene image is first determined, and a predetermined area image is determined with the position of the aiming mark as a reference position (e.g., a rectangular area with a predetermined size centered on the position of the aiming mark is determined as the predetermined area image), then the target recognition is carried out to only determine whether there is a human target within the predetermined area image corresponding to the position of the aiming mark in the current scene image, and it is thereby determined whether there is a human target being currently aimed at.

It is to be noted that, in the aiming process, the sighting device also determines, based on the target recognition with respect to the current scene image, the aiming target contained in the current scene image, such as the types of various animals in the hunting scene and their positions in the image, so as to assist the user to aim at the aiming target that is desired to be tracked through the aiming mark. In this case, the target recognition for determining the aiming target and the target recognition for determining whether there is a human target in the predetermined area image corresponding to the position of the aiming mark in the current scene image can be performed independently and in parallel. The target recognition for determining whether there is a human target the predetermined area image corresponding to the position of the aiming mark in the current scene image has a relatively smaller computational amount, and the human target is the only detection target, so the recognition accuracy usually can be better ensured. The detection result of the global detection with respect to the current scene image based on the target recognition to recognize the category and position of the aiming target can be obtained after it is determined that no human target is being currently aimed at.

In the above embodiment, the local target detection and recognition based on the target recognition for determining whether there is a human target in the predetermined area image corresponding to the position of the aiming mark can be compatible with existing sighting devices capable of target recognition for recognizing various categories of aiming targets. The existing sighting device can be functionally upgraded by adding the independent computer program for executing the human detection and warning method in accordance with embodiments of the present application, so that the sighting device can have both improved accuracy of shooting by the detection of the aiming target and improved safety of shooting by the detection of the human target.

It is to be noted that, in different embodiments, the target recognition may include: the global detection with respect to the current scene image based on the target recognition to recognize the aiming target, the global detection with respect to the current scene image based on the target recognition to recognize the human target, or the local detection with respect to the predetermined area image corresponding to the position of the aiming mark in the current scene image based on the target recognition to recognize the human target, all of which can be realized by known target recognition algorithms or using a deep learning-based approach.

Figure 4:
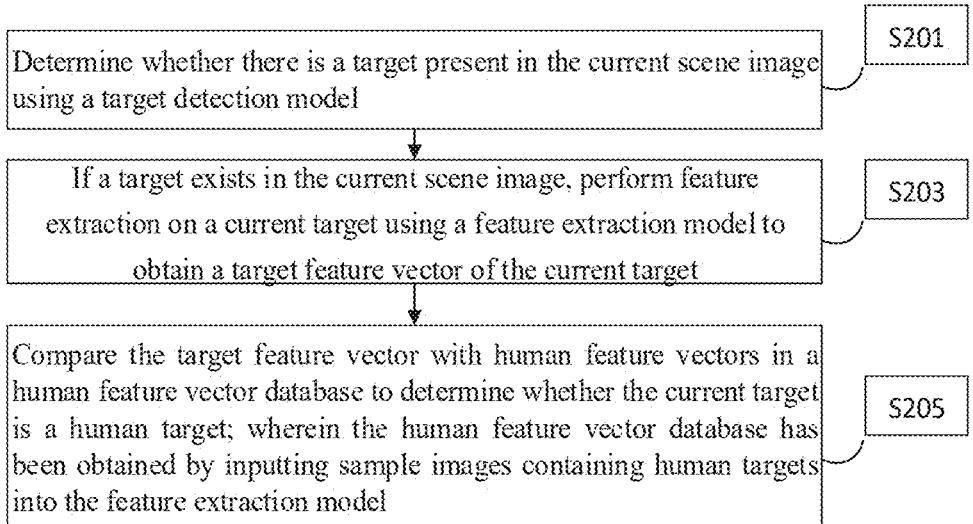
FIG. 4 shows a flowchart of detecting and recognizing a human target using an improved deep learning-based target recognition method according to one embodiment.

Referring to FIG. 4, in some embodiments, detecting and recognizing a human target is realized using an improved deep-learning-based target recognition approach, including:

Step S201, determining whether there is a target present in the current scene image using a target detection model;

Step S203, if a target exists in the current scene image, performing feature extraction on a current target using a feature extraction model to obtain a target feature vector of the current target;

Step S205, comparing the target feature vector with human feature vectors in a human feature vector database to determine whether the current target is a human target; wherein the human feature vector database has been obtained by inputting sample images containing human targets into the feature extraction model.

The target detection model and the feature extraction model are individual deep learning models. The target detection model is utilized to perform target detection with respect to the current scene image to determine whether a target exists in the current scene image (in this case, there is no need to recognize the type of the target) and, as such, the target detection model can be implemented by a general target detection model, and only a single category of target needs to be recognized, i.e., only a general target detection is needed to detect whether there is the presence of a target, which has low training requirements and high detection accuracy, can enable more lightweight design, and can be easy to deploy in the sighting device. The feature extraction model extracts features of the current target detected by the target detection model, so as to determine whether the current target is a human target based on a feature extraction result of the current target. As such, the feature extraction model only needs to focus on the feature extraction on the target in the image, which is also conducive to lowering the training requirements, enabling more lightweight design and easier deployment in the sighting device. The feature extraction model also takes sample images containing human targets as an input to perform feature extraction to obtain human feature vectors, so as to construct a human feature vector database.

Optionally, the human feature vector database contains human feature vectors representing different postures, different viewing angles, and different degrees of occlusion.

In a specific example, the feature extraction model is implemented by a pre-trained Openpose feature extractor. A large-scale dataset containing human images is collected to ensure the diversity and representativeness of the human image data, including different human body postures, viewing angles, degrees of occlusion, and environmental backgrounds, etc. Preprocessing, such as, noise removal, grayscaling, normalization, and accurate bounding box labeling, is then performed on the human images to form a specific target dataset. The Openpose feature extractor is trained based on the specific target dataset using a self-learning approach. During the training process, the output of the part before the last fully-connected layer is taken as the human feature vectors, which understandably are of fixed length and highly abstract, and can effectively capture structural information of the human body and its infrared visual features. Finally, these human feature vectors are stored to form a human feature vector database. It is to be understood that each of the human feature vectors in the human feature vector database may be a human sample corresponding to a particular posture, a particular view angle, and a different degree of occlusion.

The target detection model is obtained by training a deep learning model using a training dataset. A general target dataset may be first selected as the training dataset, and a general target detection model is obtained by training the deep learning model using the general target dataset. In an exemplary embodiment, firstly, a large number of real infrared images of a real shooting scene (e.g., a hunting scene) are obtained by actual photographing and other means, and specific positions of the targets are labeled for these images to ultimately form image-label data pairs. A large number of such data pairs are assembled to form the general target dataset required for the training, and the general target dataset is randomly divided into a training set and a testing set by a ratio of 8:2. Next, a convolutional neural network model is constructed, the convolutional neural network model is trained based on the data in the training set, and then the detection accuracy of the convolutional neural network model is verified on the test set, and this process iterates until a preset iteration termination condition is met. When the preset iteration termination condition is met, for example, when the convolutional neural network model achieves an accuracy rate of 95% for the test set, it can be considered to have obtained a general target detection model with high credibility.

The above target detection model and feature extraction model together form a target recognition model. In the actual deployment, i.e., in the application phase of the target recognition model, the current scene image is first used as the input of the target detection model, and whether there is a target in the current scene image is detected in real time by the target detection model, and if there is a target, features of the target are extracted by using the feature extraction model to generate a target feature vector. The target feature vector is compared with the human feature vector database to confirm whether the target detected by the target detection model is a human target.

In the above embodiments, preferred target recognition methods are provided for the detection and recognition of human targets. The inventors of the present application have found in their research that target detection is an important issue in the field of computer vision, which has two main tasks: recognizing target category and determining target location. Convolutional neural network model is an important approach in deep learning algorithms, which does not need any precise mathematical expression between the input and the output. The input and the output are connected by convolutional layers and the complex mapping relationship between the input and the output is learned, so that the convolutional neural network can gain the capability of mapping between the input and the output simply by training the convolutional neural network based on a large number of labeled datasets (inputs, ideal outputs). If there are too many categories of targets to be detected, and the sample data of different target categories has an uneven distribution, the network detection effect will be affected. To this end, this embodiment proposes to train a general target detection model which has only one classification result (i.e., whether or not there is a target), which can reduce the difficulty in collecting the training data and the difficulty in training the model, simplify the structure of the trained model, and reduce the platform arithmetic requirements, making it easier to be deployed in the sighting device. The use of the target detection model in combination with the feature extraction model can realize accurate and efficient recognition of the human target. In other words, the deep learning model used for target detection is typically a large model, which can directly recognize a target category, i.e., recognize a human target, but the training of the model is complicated and imposes a high training data requirement, and when it is deployed in the sighting device, it would cause problems including that the model is too large, the operation speed is slow, and the real-time capability cannot be satisfied. In contrast, the above target recognition method of the present application is a two-step process, which first detects a general target and then performs feature extraction on the target. The corresponding target detection model and feature extraction model used to do so are two small models having low training requirements and capable of meeting the requirement of real-time operation on the sighting device.

It should be noted that the target recognition for the aiming target can also be realized by using the above improved deep learning-based target recognition method under the teachings of this embodiment, which is not repeated herein.

Optionally, step S205 includes:

calculating a distance between the target feature vector and each of the human feature vectors in the human feature vector database, and determining whether the current target is a human target based on the distance.

Comparing the target feature vector with the human feature vector database is equivalent to comparing the target feature vector with the human feature vectors representing different postures, different view angles and different degrees of occlusion in the human feature vector database. The distance, such as an Euclidean distance or a cosine similarity, between the target feature vector and each of the human feature vectors is calculated to obtain a confidence degree that the target is a human target, and if the confidence degree is greater than a set threshold, the target is considered to be a human target and the human target is framed at its corresponding position; otherwise, the target is considered to be a non-human target and no processing may be performed on the target.

In the above embodiment, by extracting feature vectors of the target and constructing a human feature vector database using a specialized feature extraction model, and by judging the similarity between the feature vectors by calculating the distance between the vectors, it is made possible to achieve a more rapid and accurate judgment of whether the aiming mark in the current scene image is currently aligned with the human target.

In some embodiments, the abnormal aiming mode comprises at least one of the following:

providing a warning notice: the warning notice includes at least one of an audible warning, a light warning, a graphic warning in a display screen, and a target highlighting warning;

providing an abnormal display warning: the abnormal display includes at least one of disappearing of the aiming mark, offsetting of the aiming mark, a black screen, a splash screen, and jittering of the display screen;

shutdown of a system;

providing a warning notice and starting a timer, and providing an abnormal display warning or shutting down the system if the timer reaches a threshold and the aiming mark is currently still aligned with a human target;

issuing a shoot-locking instruction: the shoot-locking instruction is used to control a trigger locking member mounted on the shooting equipment to lock the trigger of the shooting equipment.

The abnormal aiming mode of the sighting device may be in various forms that are distinguished from the normal aiming mode and capable of constraining the current aiming and shooting operation of the user of the shooting equipment. On the premise of not conflicting with each other, the above-mentioned various means such as, providing warning notice, providing abnormal display warning, issuing a shoot-lock command and shutting down, can be used in any combination to achieve simultaneous alerting by multiple means. The abnormal aiming mode for locking the shoot will be discussed later.

In a possible specific example, in the process of the human detection and warning method performed by the sighting device, upon confirming that the aiming mark is currently aligned with a human target, the sighting device enters the abnormal aiming mode. In the abnormal aiming mode, firstly, a warning notice is provided and the timer starts to count. If the cumulative time of the warning notice reaches a threshold, for example, the warning notice lasts for 3 seconds, and the determining result with respect to the current scene image captured in real time is still confirming that the aiming mark is currently aligned with a human target, then the abnormal display warning is provided or the sighting device is directly controlled to shut down, directly restricting the user from continuing to use the normal aiming function of the sighting device.

In some embodiments, the human detection and warning method further includes:

maintaining or resuming the normal aiming mode of the sighting device if there is no human target being currently aimed at and/or there is no target tracking of a human target; or resuming the normal aiming mode of the sighting device upon receipt of a control command to manually revoke the abnormal aiming mode.

The detection result that the aiming mark is currently not at a human target may refer to a next detection result after it was previously detected that the aiming mark was at a human target, in which case the sighting device may automatically resume from the abnormal aiming mode to the normal aiming mode; or, the detection result that the aiming mark is currently not at a human target may also refer to the situation that the previous detection result was the same, namely the aiming mark was not aligned with a human target, in which case the sighting device maintains the current normal aiming mode.

Figure 5:
FIG. 5 shows a sighting device detecting an aiming target in a normal aiming mode according to one embodiment.
Figure 6:
FIG. 6 shows an example of the sighting device performing global detection in which a human target is detected but the aiming mark is not aligned with the human target.
Figure 7:
FIG. 7 shows an example of the sighting device performing local detection in which a human target is detected but the aiming mark is not aligned with the human target.
Figure 8:
FIG. 8 shows an example of the sighting device performing global detection or local detection which detects that the aiming mark is aligned with a human target (an example of warning before the sighting device enters the abnormal aiming mode when the abnormal aiming mode is triggered).

As shown in FIG. 5, in an optional example, the sighting device performs target detection in a normal aiming mode, and when a target is detected as a huntable target, such as an animal, the user moves the aiming mark, such as a crosshair, to the target frame around the target, the system works normally and the sighting device maintains in the normal aiming mode. When a general target is detected as a human target, as shown in FIG. 6, which illustrates a human target being detected by a global detection with respect to the current scene image, this time the human target needs to be marked, such as by a target frame shown in FIG. 6. FIG. 7 illustrates a detection result of a local detection with respect to the current scene image that there is a human target in the image but the aiming mark is currently not aligned with the human target. FIG. 8 illustrates a detection result of a local detection (or global detection) with respect to the current scene image that the aiming mark is currently aligned with the human target. Each of FIG. 6 and FIG. 7 illustrates a situation where the aiming mark is currently not aligned with the human target and the sighting device maintains in the normal aiming mode. However, if the user moves the shooting equipment from the state of FIG. 7 to the state of FIG. 8, making the center of the crosshair fall within the target frame, the sighting device is triggered to enter the abnormal aiming mode and first issues a warning notice to the user, which may specifically include that a warning message "Danger, continuing to target humans will force shutdown" appears in the current scene image. If the user ignores the warning information and continues to aim at the human target, then the crosshair will disappear and the system will be forced to shut down to eliminate the safety risk.

In some embodiments, the sighting device is provided with a control button, allowing for user's manual operation to revoke the abnormal aiming mode after the sighting device enters the abnormal aiming mode. When the user presses the control button, the sighting device receives a control instruction to manually revoke the abnormal aiming mode, and according to the control instruction the sighting device resumes the normal aiming mode. The provision of the control button for revoking the abnormal aiming mode can provide the user with the ability to quickly switch to the normal aiming mode of the sighting device after the user has noticed the current safety risk and has taken measures to eliminate the risk, thereby achieving the purpose of effectively alerting the user while also providing the user with more operational convenience.

Figure 9:
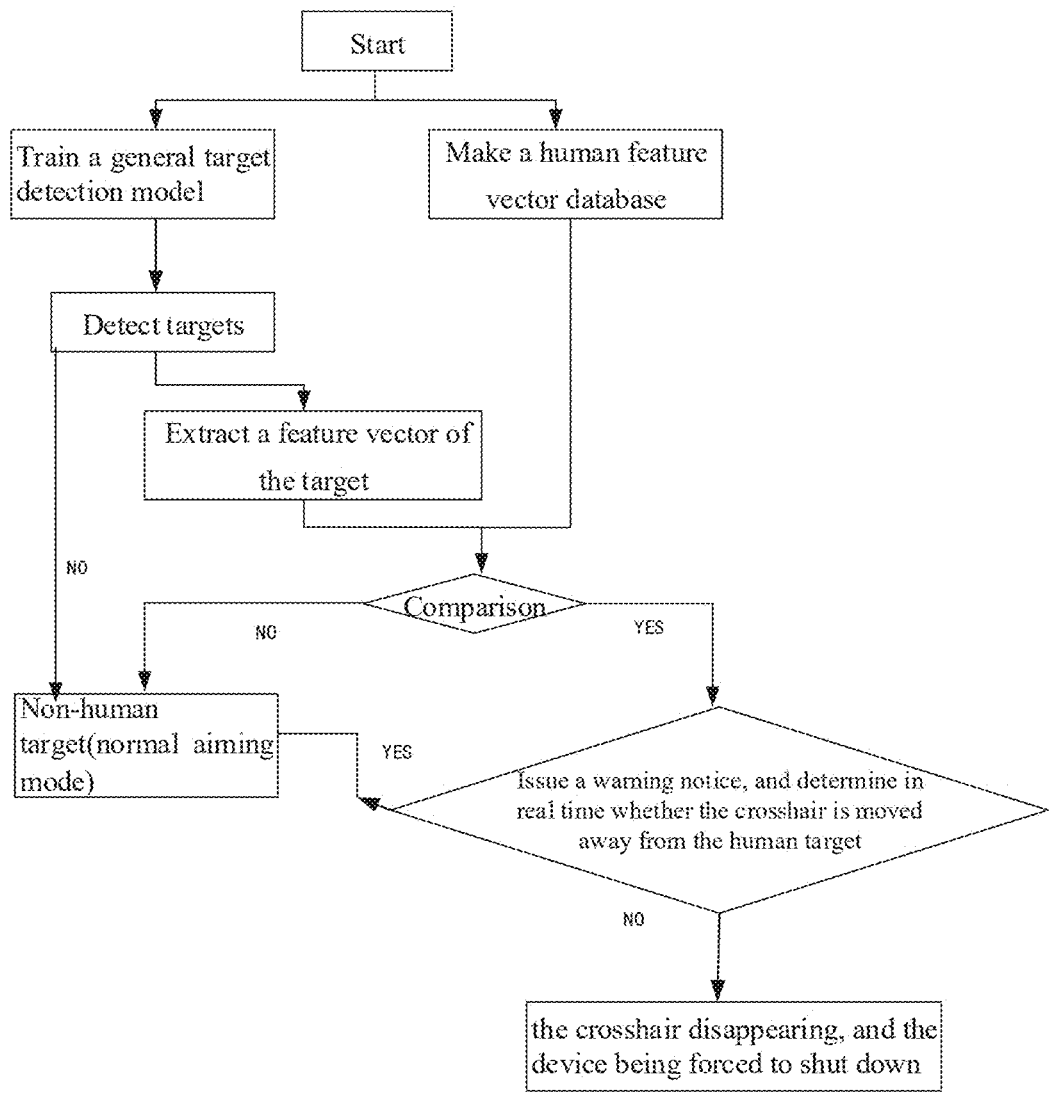
FIG. 9 shows a schematic diagram of a human detection and warning method in an optional specific example.
Figure 10:
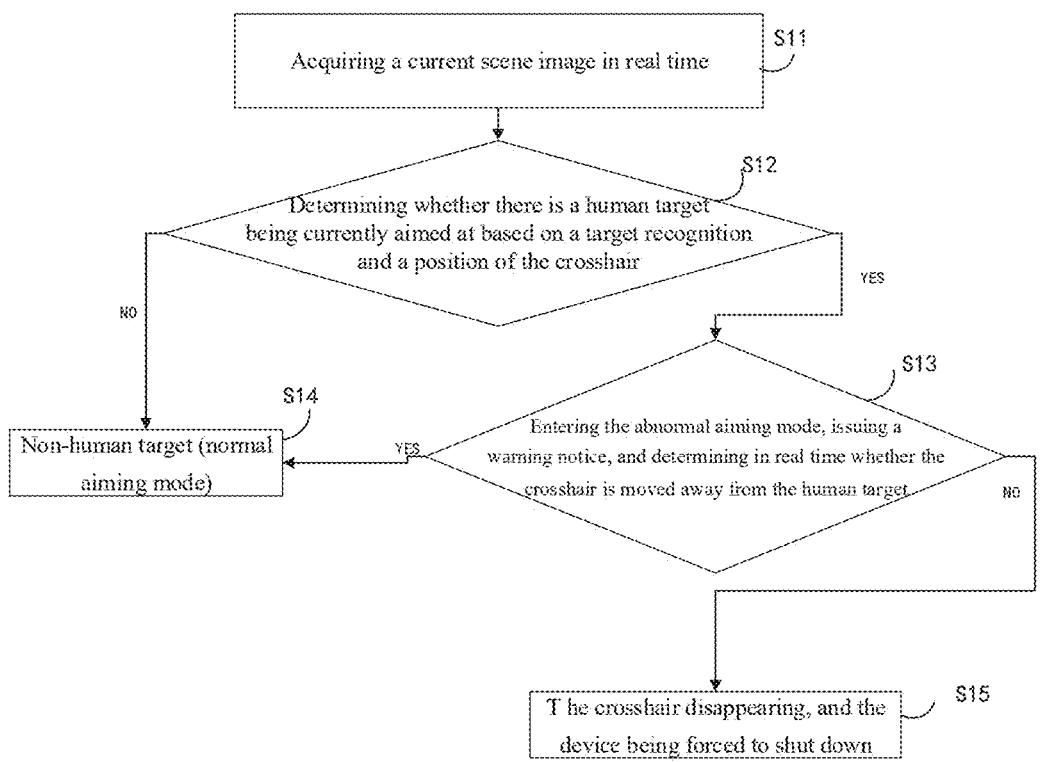
FIG. 10 shows a flowchart of the human detection and warning method corresponding to the example of FIG. 9.

In order to have a more thorough understanding of the human detection and warning method provided by the embodiments of the present application, a detailed description is made below with reference to FIG. 9 and FIG. 10, in which the crosshair is taken as a specific example of the aiming mark. The human detection and warning method mainly includes the following steps S11~S15.

S11, acquiring a current scene image in real time.

S12, determining whether there is a human target being currently aimed at based on a target recognition and a position of the crosshair, and if yes, proceeding to execute S13; if not, proceeding to execute S14.

S13, entering the abnormal aiming mode, issuing a warning notice, and determining in real time whether the crosshair is moved away from the human target; if so, proceeding to execute S14; if not, proceeding to execute S15.

S14, working in a normal aiming mode.

S15, the crosshair disappearing, and the device being forced to shut down.

Figure 11:
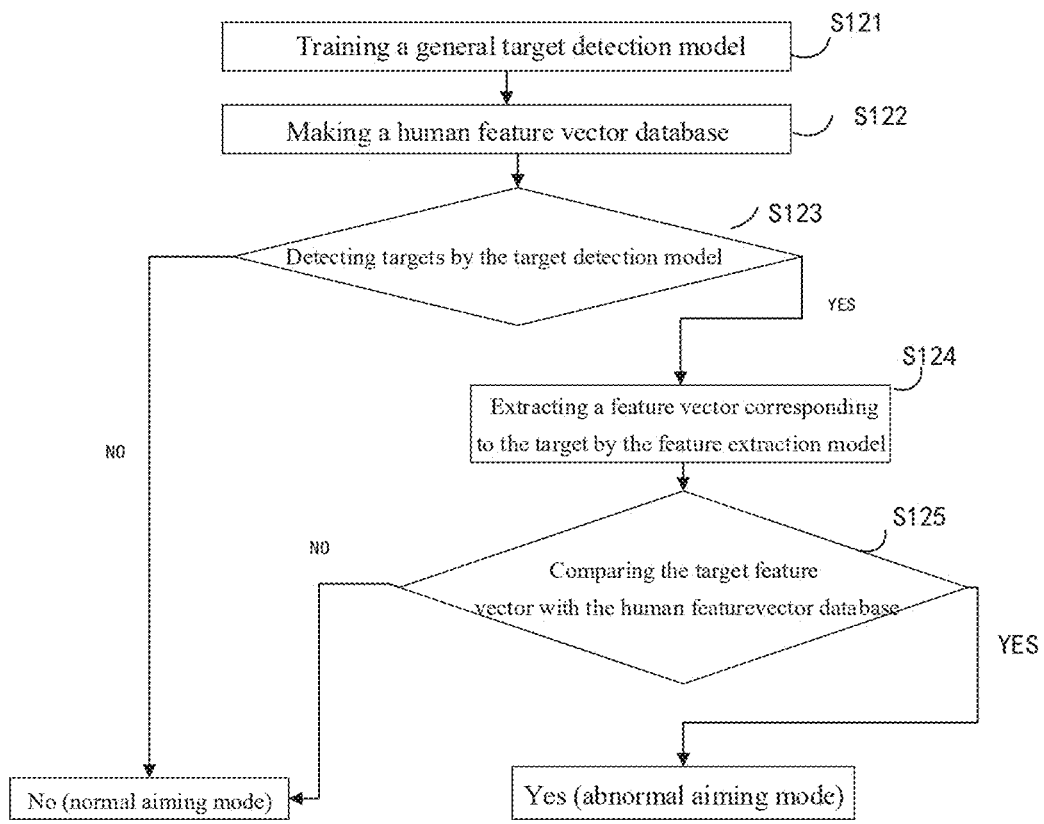
FIG. 11 is a flowchart of determining whether a crosshair is aligned with a human target in the example of FIG. 9.
Figure 12:
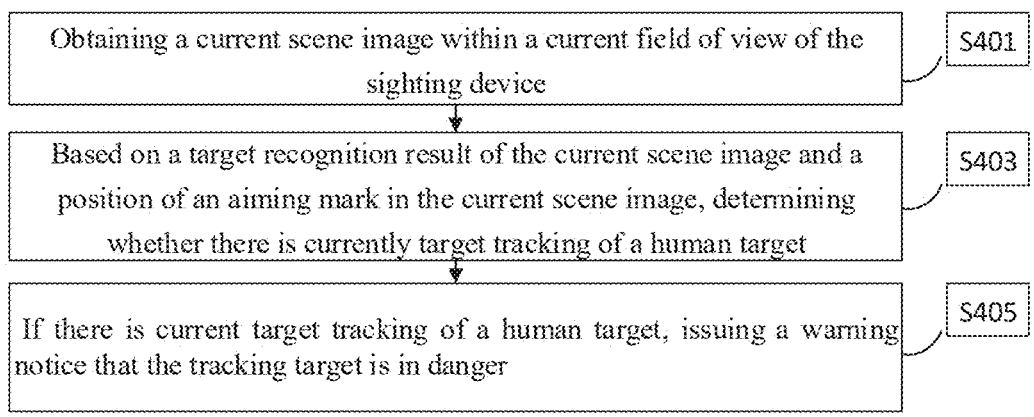
FIG. 12 shows a flowchart of a human body detection and warning method based on target tracking according to one embodiment.

At step S12, the sighting device is exemplarily illustrated as an infrared sight, and the improved deep learning-based target recognition method is exemplarily used to determine whether there is a human target being currently aimed at. Refer to FIG. 9 and FIG. 11, step S12 includes:

S121, training a general target detection model.

1) Producing a General Target Dataset

A large number of real infrared images of a real hunting scene are obtained by actual photographing and other means, and specific positions of the targets are labeled for these images to ultimately form image-label data pairs. A large number of such data pairs are assembled to form the general target dataset, and the general target dataset is randomly divided into a training set and a testing set by a ratio of 8:2.

2) Training Target Detection Model

A convolutional neural network model is constructed, which is trained based on the data in the training set, and then the detection accuracy of the convolutional neural network model is verified using the test set, and this process iterates. When the convolutional neural network model achieves an accuracy rate of 95% for the test set, it can be considered to have obtained a general target detection model with high credibility.

S122, making a human feature vector database

1) Collect Sample Images

A large-scale dataset containing human images is collected to ensure the diversity and representativeness of the human image data, including different human body postures, viewing angles, degrees of occlusion, and environmental backgrounds, etc. Preprocessing, such as, noise removal, grayscaling, normalization, and accurate bounding box labeling, is then performed on the human images for subsequent model training.

2) Training and Acquiring Human Feature Vectors

The Openpose feature extractor, which is specially designed for human recognition, is chosen as the feature extraction model, and the model is trained by self-learning based on the aforementioned dataset of the sample images. During the training process, the outputs of the part before the last fully-connected layer are taken as the feature vectors of the human body, which are of a fixed length and highly abstract, and can effectively capture the structural information and infrared visual characteristics of the human body. Finally, the human feature vectors are stored to form a feature vector database, with each vector corresponding to a human body sample representing a specific posture, a specific viewing angle, and degree of occlusion.

S123, detecting targets by the target detection model; if no target is detected, the current judgment result of step S12 is no; if yes, proceeding to execute step S124.

S124, extracting a feature vector corresponding to the target by the feature extraction model.

S125, comparing the target feature vector with the human feature vector database; if the comparison result is different, the current judgment result of step S12 is no; if yes, the current judgment result of step S12 is yes.

The current result "no" of step S12 may include the following situations: first, it may refer to that the global detection with respect to the image results in no human target being detected, as shown in FIG. 5; or it may refer to that although a human target is detected by the global detection with respect to the image, the crosshair is not aligned with the human target, as shown in FIG. 6; or it may refer to that the local detection with respect to the location of the crosshair in the image results in no human target being detected, as shown in FIG. 7.

The current result "yes" of step S12 refers to the situation where the crosshair in the image is aligned with the human target. This may include a situation where it is first determined that a human target is present in the image by a global detection with respect to the image and then it is determined that the crosshair is aligned with the human target based on the position of the crosshair; alternatively, this may also include another situation where, after the position of the crosshair is determined, a local detection is performed with respect to the position of the crosshair so as to determine that the crosshair is aligned with the human target, as shown in FIG. 8.

The human detection and warning method provided by embodiments of the present application includes at least the following features:

First, a human detection and warning device integrated with a human target detection technology is provided, which can be directly integrated onto the sighting device, and the safety performance of various shooting equipment can be conveniently upgraded by installing the sighting device to the shooting equipment. When the sighting device, by analyzing the aiming image in real time, timely recognizes that the aiming mark is currently aligned with a human target, that is to say, when the shooting equipment is currently aiming at a human target, then the sighting device intelligently enters the abnormal aiming mode to warn the user of the shooting equipment that shooting is not allowed at present and limit the normal aiming function of the sighting device. As such, this can enhance the shooter's perception of the surrounding environment, greatly reduce the probability of accidents, and improve the safety performance of civilian shooting equipment. In the field of view of various civilian shooting scenes, there may be unavoidable human activities; if the sighting device is not allowed to use as long as there is a human activity, this may probably cause that the shooting equipment cannot be used in the normal civilian shooting scenes. Entry into the abnormal aiming mode is on condition that the shooting equipment is currently aiming at a human target, which not only ensures the safety use of the shooting equipment, but also ensures the normal use of the shooting equipment in various civilian shooting scenes.

Second, an improved deep learning-based target recognition method for detecting human targets is provided. By combining a general target detection model and a specialized feature extraction model for human feature extraction, the improved deep learning-based target recognition method provided by embodiments of this application requires less sample data and runs faster compared to known end-to-end deep learning methods for directly learning human target features. The improved deep learning-based target recognition method can avoid the risk of overfitting (i.e., the model performs well on the training set but poorly on unseen data) due to insufficient training data, uneven distribution of various types of samples or complex model structure. The model has a better generalization performance, making it is easier to be grafted to the sighting device.

In contrast, existing target detection methods mainly include traditional algorithms and end-to-end deep learning-based algorithms. The traditional algorithms first use, for example, the Canny edge detection algorithm or morphological operations to preliminarily separate a potential human body region from the image, and then use histogram analysis, wavelet transform, and similar methods to perform feature extraction on the potential human body region, to further distinguish effective features between the human body and the other background, so as to obtain the target feature vectors of the potential region. Finally, a support vector machine, a decision tree, a random forest, or a Bayesian network is used to judge whether there is a human in the potential region based on these target feature vectors. However, these traditional algorithms suffer from poor robustness and are usually unable to respond flexibly when faced with complex environmental changes (e.g., changes in light, occlusion, changes in human posture, etc.), resulting in a high false detection rate and high missed detection rate. In addition, the traditional algorithms lack a self-learning mechanism and are unable to recognize unseen samples and, therefore, have a poor generalization performance.

Regarding the known end-to-end deep learning methods, the core is to utilize the powerful feature extraction and classification capability of convolutional neural networks (CNNs). Since it is necessary to directly learn a large number of human target features representing different postures, different viewing angles and different degrees of occlusion, a large number of balanced sample infrared image data with these labels are required accordingly, which relies more on manually-designed features and labels, is difficult to automatically adapt to the changes of infrared human features in different scenes, and thus require large computational resources. In addition, when faced with complex environmental changes (e.g., changes in light, occlusion, changes in human posture, etc.), it may result in a high false detection rate and high missed detection rate. If there is insufficient training data, an uneven distribution of various types of samples, or a complex model structure in the same scene, it may lead to the risk of overfitting (i.e., the model performs well on the training set but poorly on unseen data), and thus lead to poor generalization performance.

FIGS. 12 to 15 illustrate an exemplary embodiment of a human detection and warning method based on target tracking, in which entry into an abnormal aiming mode is triggered by the detection of current target tracking of a human target and the abnormal aiming mode is to issue a warning notice that the tracking target is in danger. The method includes the following steps:

S401, obtaining a current scene image within a current field of view of the sighting device;

S403, based on a target recognition result of the current scene image and a position of an aiming mark in the current scene image, determining whether there is currently target tracking of a human target;

S405, if there is current target tracking of a human target, issuing a warning notice that the tracking target is in danger.

In some embodiments, the aiming mark is kept at a center of the image, and when the aiming mark is aligned with a certain target in the image, it means that the shooting equipment is currently aiming at the target, and the position of the aiming mark in the current scene image means the center of the image where the aiming mark is kept. In some other embodiments, the aiming mark may also be a dynamic mark, i.e., the aiming mark may not be kept at the center of the image, but its position in the image may be moved, and similarly, when the aiming mark is aligned with a certain target in the image, it means that the shooting equipment is currently aiming at, and the position of the aiming mark in the current scene image refers to the current position of the aiming mark in the image determined in real time.

With the sighting device installed to the shooting equipment, by executing the human detection and warning method based on target tracking, it can be calculated in real time with respect to the current scene image in the current field of view to determine whether the target currently being tracked by the shooting equipment is a human target, and in the case where there is a human target being currently tracked, the sighting device can be controlled to issue a warning notice that the tracking target is in danger, and notify the user to quickly change the target to be tracked through target highlighting warning. In this embodiment, the warning notice of the target being tracked in danger is a target highlighting warning, which is one of the warning notices in the abnormal aiming mode. Of course, other abnormal aiming modes than the warning notice may also be used, such as the abnormal display warning, shutdown of the device, issuing a shoot-locking instruction, and the like, as provided in the aforementioned embodiments.

In some embodiments, step S403 includes:

performing target recognition with respect to the current scene image to determine a human target contained in the current scene image;

determining whether the human target is currently being tracked based on relative position change between the human target and the aiming mark during a set time period.

The set time period may refer to a time value preset by the sighting device before shipped from the factory, or may refer to a time value that the sighting device obtains from the user setting or adjustment through a human-computer interaction interface. The target recognition may be a global target detection and recognition with respect to the current scene image, which recognizes and marks all the human targets contained in the current scene image, and at the same time, according to the changing relationship between the position of the human target and the position of the aiming mark in the current scene image within the set time period, predicts whether there is currently a target tracking of the human target, and thereby determine whether the target at which the shooting equipment user is ready to aim is a human target.

It is to be noted that, in the aiming process, the sighting device also determines, based on a target recognition with respect to the current scene image, the aiming target contained in the current scene image, such as the types of various animals in the hunting scene and their positions in the image, so as to assist the user to aim at the aiming target that is desired to be tracked through the aiming mark. The detection of the aiming target is achieved by target recognition which performs a global detection with respect to the current scene image. In this embodiment, the human target may be considered as one of the target types of the target recognition, and determining the human target can be performed at the same step with detecting and recognizing the aiming target by means of the target recognition. FIG. 6 schematically illustrates that a human target is detected by the global detection performed with respect to the image. The target tracking may also refer to that the sighting device determines which target the shooting equipment is currently tracking according to the relative position change relationship between the position of each target and the position of the aiming mark in the image within the set time period. A specific mark may be used to mark a target tracking object that is currently determined and is a non-human target. For example, if the target tracking object is a non-human target, then a moving track of the currently determined target tracking object during the target tracking process can be displayed in the image, so as to assist the shooting equipment user in better predicting the dynamic changes in the position of the target tracking object, and to shoot more accurately. If the current target tracking object is a human target, then before the user carries out the aiming, the warning notice of the tracking target in danger is issued, so as to notify the user to timely change the target tracking object.

In the above embodiment, the target recognition method is carried out which performs target detection and recognition with respect to the current scene image, so that the detection of the aiming target by the sighting device to improve the accuracy of the shooting, and the detection of the human target by the sighting device to improve the safety of the shooting can be integrated in the same step, so as to improve real-time capability. In addition, the sighting device can also perform real-time prediction for the target that is currently being actively tracked by the shooting equipment, and in the case that the target tracking object is not a human target but belongs to an aiming target that is permitted to shoot, a specific marking can be used to mark that target tracking object, so as to assist the user in better accomplishing the aiming and shooting.

Optionally, determining whether the human target is currently being tracked based on a change in relative position between the human target and the aiming mark during a set time period includes at least one of the following:

determining whether the human target is considered to fast approach the aiming mark and has reached a preset range of the aiming mark, based on a trend of change in the relative position between the human target and the aiming mark in the current scene image during the set time period or within a consecutive preset number of frames, to determine whether there is currently target tracking of the human target;

determining whether the human target remains in a preset range of the aiming mark within a preset time threshold, based on the relative position between the human target and the aiming mark in the current scene image during the set time period or within a consecutive preset number of frames, to determine whether there is currently target tracking of the human target; and determining whether the human target is considered to fast approach the aiming mark, has reached a preset range of the aiming mark, and remains in a preset range of the aiming mark within a preset time threshold, based on the relative position between the human target and the aiming mark in the current scene image during the set time period or within a consecutive preset number of frames, to determine whether there is currently target tracking of the human target.

Usually, the user needs to lock a target before aiming, and then use the aiming mark to track the target in order to aim at it.

Figure 13:
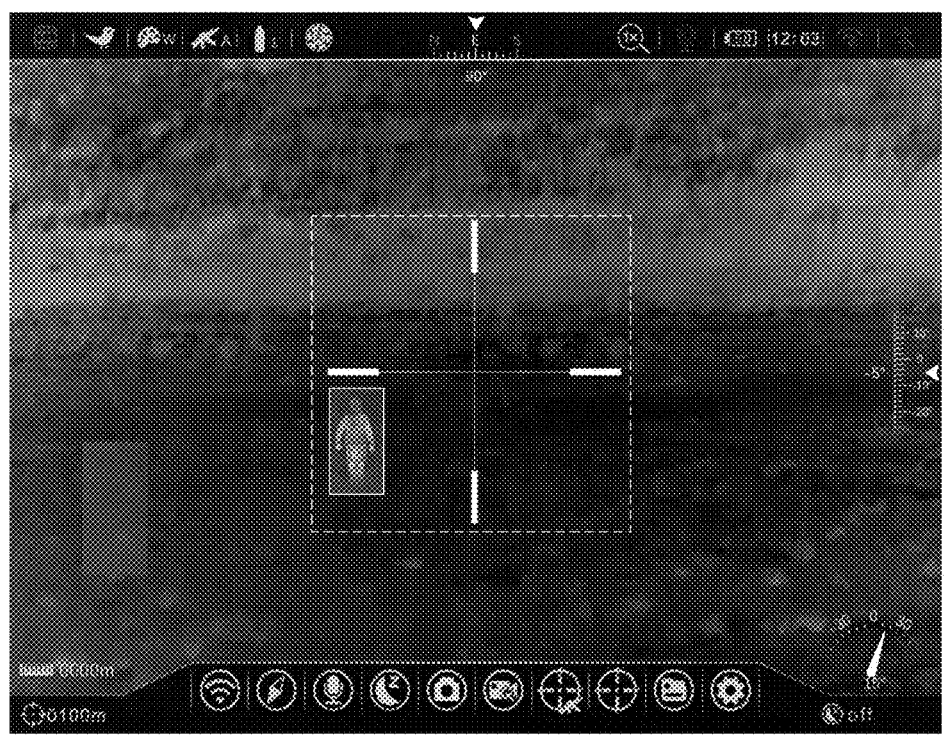
FIG. 13 shows an example of a human target detected to fast approach an aiming mark and have reached a preset range of the aiming mark.

Determining whether or not target tracking is being performed may include the following situations. In a first situation, it is determined whether the human target is considered to fast approach the aiming mark, and whether the human target has reached a preset range of the aiming mark, based on the trend of changes in the relative positions of the human target and the aiming mark in the current scene image. For example, when the distance between the human target and the aiming mark decreases for M consecutive frames of images, it is determined that the aiming mark and the human target are fast approaching each other, and the relative distance between the human target and the aiming mark is already small. This is more suitable for the situation when the human target is detected for the first time in a marginal position in the image, and the user mistakenly treats the human target as a shootable target and performs the target tracking, and accordingly the warning notice of the tracking target in danger can be timely issued. Referring to FIG. 6 and FIG. 13, after the human target is detected as shown in FIG. 6, when the human target is detected to approach the aiming mark as shown in FIG. 13 based on the trend of change in the position of the human target and the position of the aiming mark in the multiple consecutive frames of images, target tracking of the human target can be considered to exist.

Figure 14:
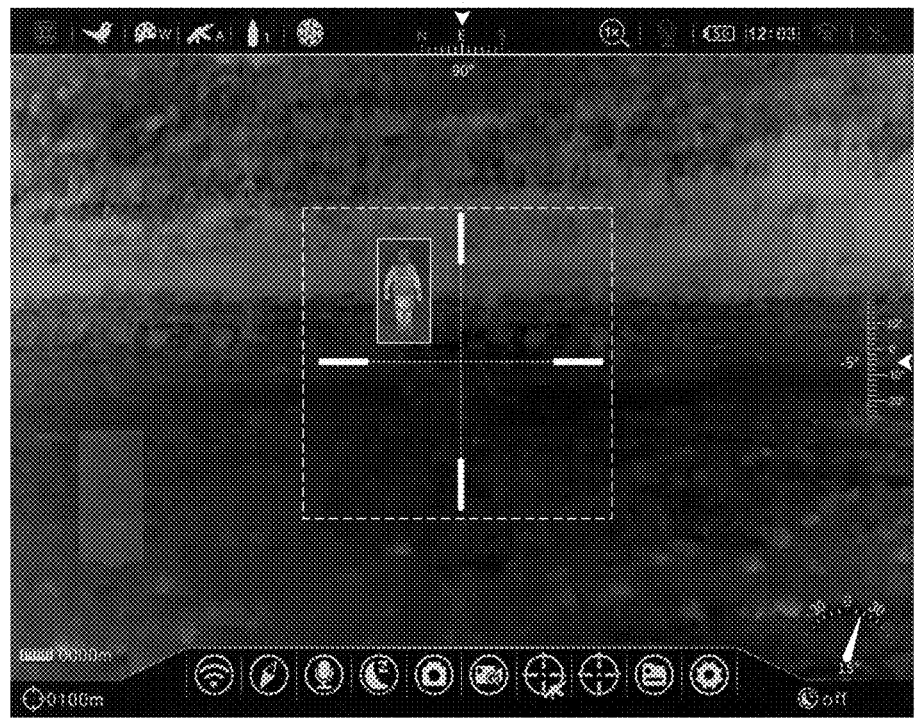
FIG. 14 shows an example of a human target detected to remain within a predetermined range of an aiming mark.

In a second situation, it may be determined whether the human target remains within a preset range of the aiming mark within a preset time threshold, which is more suitable for the situation when the human target is detected for the first time, the human target and the aiming mark are already relatively close to each other, and the user mistakenly treats the human target as a target that can be aimed at and therefore carries out the target tracking, and accordingly the warning notice of the tracking target in danger can be timely issued. Referring to FIG. 13 and FIG. 14, after the human target is detected for the first time as shown in FIG. 13, the human target is detected to approach the position of the aiming mark in the next consecutive frames, which can be regarded that there is the existence of target tracking of the human target.

In a third situation, it may be determined whether the human target is considered to fast approach the aiming mark, and whether the human target remains within a preset range of the aiming mark within a preset time threshold. In comparison with the above-described first situation, it is determined whether the user is carrying out the aiming by further determining whether the human target remains within the preset range of the aiming mark within the preset time threshold, e.g., the aiming mark remains in an image area corresponding to the human target for more than N seconds or successive L frames, thereby distinguishing the case in which the user is rapidly moving the shooting equipment in search of a target but has not locked the target, which can better meet different habits of different users.

It is to be noted that the length of the preset time threshold is usually less than the set time period, and the preset time threshold may also be a time value preset by the sighting device before shipped from the factory, or a time value that the sighting device obtains from a user setting or user adjustment through the human-machine interface. Alternatively, the preset time threshold may be a length of time that the current user usually maintains aiming at the target, which is calculated by the sighting device based on the historical use record and use habits of the individual user. The preset time threshold may be corrected and updated based on the historical use record of the user.

In the above embodiments, a strategy for determining whether there is target tracking of a human target can be set at the same time, so that the sighting device can predict and determine whether there is target tracking of a human target according to the habits of different users and different characteristics of various scenarios, thus enhancing the practicality of the sighting device.

In some embodiments, in step S403, before determining whether there is currently target tracking of a human target, the method further includes:

determining whether the human target is considered to fast approach the aiming mark based on a trend of changes in a relative position between the human target and the aiming mark in the current scene image during a set time period or in a consecutive preset number of frames; and issuing a warning notice of paying attention to the human target if the human target is considered to fast approach the aiming mark and has reached a preset range of the aiming mark, and the human target does not meet the condition of remaining within a preset range of the aiming mark within a preset time threshold, or if the human target is considered to fast approach the aiming mark but has not reached a preset range of the aiming mark.

Issuing the warning notice for paying attention to the human target includes:

displaying on a display screen a warning message that a human target is currently approaching; and/or highlighting on a display screen a periphery, outline or image area of the human target determined to be fast approaching with a marking distinguishable it from other targets.

In the present embodiment, during the course of determining the target tracking, the sighting device may issue a warning notice of paying attention to the human target when it recognizes that the human target and the aiming mark are fast approaching each other but the relative distance between the human target and the aiming mark has not yet reached the preset range of the aiming mark, i.e., at this time, the condition of confirming that it belongs to the target tracking has not yet been met. The warning notice of paying attention to the human target may be a textual notice directly displayed on the screen, or highlighting of the periphery, outline, or image area of the human target determined to be fast approaching with a marking that is distinguishable it from other targets. For example, the human target fast approaching the aiming mark may be marked by a specific marking for differentiation, and the specific marking may be a specific color marking or a specific shape marking, to notify the user that the current fast approaching target is actually a human target.

In the above embodiment, during the course of determining whether there is currently target tracking of the human target, upon the human target and the aiming mark being determined to be fast approaching each other, the warning notice of paying attention to the human targe is issued, so that the sighting device can provide different levels of alerts for the human target appearing in the current scene image. Upon recognition that the human target and the aiming mark are fast approaching each other, the warning notice of paying attention to the human target is issued, but stricter conditions are applied in determining that target tracking is carried out on the human target, which can have the effect of timely alert, while also taking more complex scenes and more operating habits of the users into account.

In some embodiments, issuing a warning notice of the tracking target in danger includes:

displaying on a screen a warning notice that the target tracking object is a human target; and/or, highlighting on the screen a periphery, outline or image area of the human target determined as the target tracking object using a dynamic marking.

In the present embodiment, where it is determined that there is currently target tracking of the human target, the warning notice alerting the user that the tracking target is in danger may be highlighted in combination with the dynamic marking, and the dynamic marking can provide a more significant alerting effect, so as to differentiate different levels of alerts between the alert when the human target and the aiming mark are fast approaching each other and the alert when it is determined that there is currently target tracking of the human target, ensuring that a more comprehensive alert can be provided to the user, and at the same time, the use habits of different users can be taken into account so as not to cause inappropriate restrictions.

In some embodiments, step S403 includes:

performing target recognition within a preset range of the aiming mark based on the position of the aiming mark in the current scene image;

determining, based on the target recognition, whether a human target is contained within the preset range;

If a human target is contained within the preset range, determining whether there is target tracking of the human target by determining whether the human target is contained within the preset range in the current scene image during a set time period or for each of a consecutive preset number of frames.

In this embodiment, in the process of determining whether a human target is currently aimed at, according to the position of the aiming mark in the current scene image, a preset region image is determined with the position of the aiming mark as a reference position, such as a preset size rectangular region centered on the position of the aiming mark as the preset region image, and then through target recognition, only the preset region image corresponding to the position of the aiming mark in the current scene image is confirmed. Then, through the target recognition, it can only confirm the existence of a human target in the current scene image corresponding to the position of the aiming mark, and accordingly determine whether there is a human target within a certain range close to the aiming mark.

It is to be noted that the sighting device, in performing the process of aiming, also determines, based on the target recognition with respect to the current scene image, the aiming target contained in the current scene image, such as the types of various animals in the hunting scene and their positions in the image, so as to assist the user to aim at the aiming target that is desired to be tracked through the aiming mark. In this case, the target recognition for determining the aiming target and the target recognition for determining whether a human target is contained in a predetermined area image corresponding to the position of the aiming mark in the current scene image can be performed independently and in parallel, i.e., determining whether there is currently target tracking of a human target can be performed independently and in parallel. Referring to FIG. 7, a local detection with respect to the current scene image is performed to detect whether there is a human target contained in a preset area image corresponding to the aiming mark, FIG. 7 shows that there is a human target existing in the current scene image but there is no human target existing in the preset area image corresponding to the aiming mark. The target recognition for determining whether there is a human target in the predetermined area image corresponding to the position of the aiming mark in the current scene image has a relatively smaller computational amount, and the human target is the only detection target in this step, so the recognition accuracy usually can be better ensured. The detection result of the global detection with respect to the current scene image based on the target recognition to recognize the category and position of the aiming target can be obtained after it is determined that there is no human target being currently tracked.

In the above embodiment, the local target detection and recognition based on the target recognition for determining whether there is a human target in the predetermined area image corresponding to the position of the aiming mark can be compatible with existing sighting devices capable of target recognition for recognizing various types of aiming targets. The existing sighting device can be functionally upgraded by adding the independent computer program for executing the human detection and warning method in accordance with embodiments of the present application, so that the sighting device can have both improved accuracy of shooting by the detection of the aiming target and improved safety of shooting by the detection of the human target.

Figure 15:
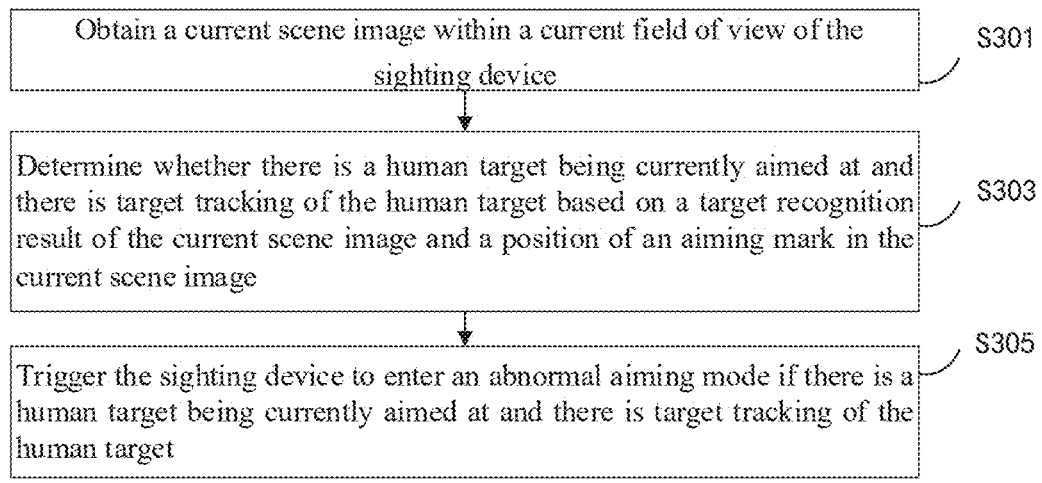
FIG. 15 shows a structure of a human detection and warning device based on target tracking according to embodiment.

It should be noted that the foregoing embodiments are not all embodiments under the inventive conception of the present application, and different embodiments of the present application combined with each other in a non-conflicting manner shall also fall within the protection scope of the present application. FIG. 15 illustrates an exemplary embodiment of a human detection and warning method, in which entry into an abnormal aiming mode is triggered by the detection of a human target currently being aimed at and being tracked. The human detection and warning method provided in this embodiment includes:

S301, obtaining a current scene image within a current field of view of the sighting device;

S303, determining whether there is a human target being currently aimed at and there is target tracking of the human target based on a target recognition result of the current scene image and a position of an aiming mark in the current scene image; and S305, triggering the sighting device to enter an abnormal aiming mode if there is a human target being currently aimed at and there is target tracking of the human target.

In this embodiment, the conditions for triggering the sighting device to enter the abnormal aiming mode include: condition 1, there is a human target being currently aimed at; and condition 2, there is target tracking of the human target.

This is in consideration of the fact that in practical application scenarios, if it is only detected that a human target is being aimed at, this may be unintentionally caused during the movement of the shooting equipment, and in this case, if the shooting equipment is quickly moved away from the human target without continuing the target tracking, it can be assumed that the user in fact has no intention of shooting the human target and, therefore, there is no need to trigger the abnormal aiming mode. On the other hand, if the user has been actively tracking the human target instead of moving the shooting equipment away from the human target after aiming at the human target, it can be assumed that the user has the intention to shoot the human target and there is a need to trigger the abnormal aiming mode. Correspondingly, if the human target is tracked only, but is not really being aimed at, accurate shooting cannot be realized in this case, and it can be assumed that the user actually has no intention to shoot the human target and there is no need to trigger the abnormal aiming mode. However, if the user aims at the human target after the target tracking, it can be assumed that the user has the intention to shoot the human target and there is a need to trigger the abnormal aiming mode.

Determining of condition 1 and determining of condition 2 may be performed in any sequence, that is, it may be determined that there is a human target being currently aimed at based on the target recognition result and the position of the aiming mark before determining whether the condition 2 is satisfied, and determining of condition 1 and determining of condition 2 may be performed in the same manner as in the foregoing embodiments, explanation of which will not be repeated herein. Alternatively, it may be determined that there is currently target tracking of the human target based on the target recognition result and the position of the aiming mark before determining in real time whether the condition 1 is satisfied, and likewise determining of condition 1 and determining of condition 2 may be performed in the same manner as in the foregoing embodiments, explanation of which will not be repeated herein.

FIG. 8 illustrates an example of the sighting device entering the abnormal aiming mode and first issuing a warning to the user when the abnormal aiming mode is triggered, which specifically includes that a warning notice "Danger, continuing to target humans will force shutdown" appears on the display screen of the current scene image. If the user ignores the warning notice and continues to aim at the human target, the crosshair will disappear and the system will be forced to shut down, eliminating the safety risk.

In this embodiment, if a human target is being currently aimed at but no target tracking is performed on the human target, the sighting device remains in the normal aiming mode. If there is currently target tracking of the human target but the human target is currently not being aimed at, the sighting device also remains in the normal aiming mode.

Taking the existence of target tracking of the human target and the human target being aimed at together as a condition for triggering the sighting device to enter the abnormal aiming mode, when the shooting equipment aimed at the human target at a certain moment in the course of rapid movement but has not stayed on the human target, the sighting device maintains the normal aiming mode without being triggered into the abnormal aiming mode, which takes into account the use habits of different users without causing inappropriate restrictions. And for the mis-tracking and misaiming of the human target, the abnormal aiming mode of the sighting device is triggered in time to alert and restrict the user to continue to use the sighting device. For those shooting equipment originally having no limitation in its application scenarios imposed thereon, by installing the sighting device on them, their applicable scenarios can be limited to only civilian scenarios such as hunting, making the shooting equipment unable to use in the military scenario, thus effectively enhancing the safety of using the shooting equipment.

When the abnormal aiming mode is to issue a shoot-locking instruction, the shoot-locking instruction is used to control a trigger locking member mounted on the shooting equipment to lock a trigger of the shooting equipment. The trigger locking member is a structural member provided on the shooting equipment for locking or unlocking the trigger of the shooting equipment in cooperation with the sighting device. It is to be understood that the trigger locking member has a first state for locking the trigger and a second state for unlocking the trigger. Typically, the trigger locking member can be provided as a separate accessory of the sighting device or the shooting device, and can be later installed on the shooting equipment. Of course, the trigger locking member can also be integrated and pre-installed as part of the shooting equipment before the shooting equipment is shipped from the factory, i.e., the shooting equipment itself is designed to include a structural member for locking or unlocking the trigger, which can switch between the first state for locking the trigger and the second state for unlocking the trigger according to a control command of the sighting device. Of course, the trigger locking member may also be integrated as part of the sighting device, i.e., the sighting device includes a structural member for locking or unlocking the trigger, and the trigger may be locked or unlocked according to a control command of the sighting device. The trigger locking member of the present application may either be a stand-alone structural member or be integrated on the shooting equipment or the sighting device, and is not limited herein.

Figure 16:
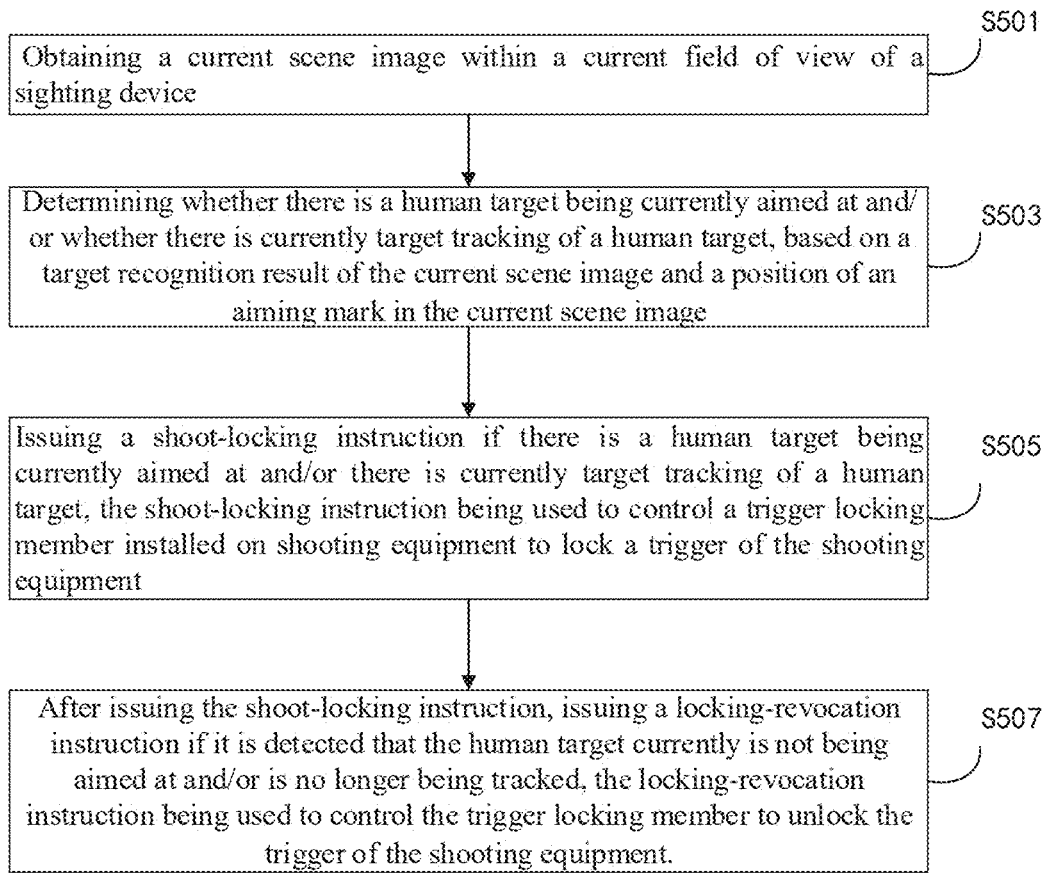
FIG. 16 shows a flowchart of a gun-sight linked human detection and protection method according to one embodiment.

FIG. 16 illustrates an exemplary embodiment of a gun-sight linked human detection and protection method in which an abnormal aiming mode is to issue a shoot-locking instruction, the method including:

S501, obtaining a current scene image within a current field of view of a sighting device;

S503, determining whether there is a human target being currently aimed at and/or whether there is currently target tracking of a human target, based on a target recognition result of the current scene image and a position of an aiming mark in the current scene image; and S505, issuing a shoot-locking instruction if there is a human target being currently aimed at and/or there is currently target tracking of a human target, the shoot-locking instruction being used to control a trigger locking member installed on shooting equipment to lock a trigger of the shooting equipment.

The gun-sight linked human detection and protection method provided by embodiments of the present application may be applied to the sighting device, which may specifically mean that the method is carried out by a processor within the sighting device which executes a computer program. The sighting device, in the process of executing the gun-sight linkage human detection and protection method, takes the human target as one of the objects of interest for image detection in the current scene image, and determines whether there is a human target being currently aimed at, and/or whether there is target tracking of a human target, based on the target recognition result and the position of the aiming mark. If the shooting equipment is currently aiming at a human target and/or there is currently target tracking of a human target, the sighting device issues a shoot-locking instruction to the trigger locking member to control the trigger locking member to lock the trigger of the shooting equipment. In other words, when the shooting equipment is aiming at a human target and/or there is target tracking of a human target, it is considered that the user has the intention to shoot the human target, and in this case the sighting device can lock the trigger of the shooting equipment through the control of the trigger locking member so that the user is unable to fire at this time. In this case, the sighting device can control the trigger locking member to lock the trigger of the shooting equipment, so that the user currently cannot shoot, in order to restrict the shooting device from shooting at the human target, thereby enhancing the safety of using the civilian shooting equipment.

In some embodiments, the gun-sight linked human detection and protection method further includes:

S507, after issuing the shoot-locking instruction, issuing a locking-revocation instruction if it is detected that the human target currently is not being aimed at and/or is no longer being tracked, the locking-revocation instruction being used to control the trigger locking member to unlock the trigger of the shooting equipment.

It is noted that the shoot-locking instruction may be issued by the sighting device only when it is determined that there is a human target currently being aimed at or only when it is determined that there is currently target tracking of a human target, in which case the locking-revocation instruction may be issued, accordingly, when it is determined that there is no human target currently being aimed at or when it is determined that there is no longer target tracking of a human target. If the sighting device is configured to issue the shoot-locking instruction when it is determined that there is a human target currently being aimed at or when it is determined that there is currently target tracking of a human target, then the sighting device issues the locking-revocation instruction when it is detected that there is no human target currently being aimed at and there is no longer target tracking of a human target.

After the sighting device controls the trigger locking member to lock the trigger of the shooting equipment, when it is detected that there is no human target currently being aimed at and/or there is no longer target tracking of a human target, it indicates that there is currently no risk of shooting the human target, and the sighting device controls the trigger locking member to unlock the trigger, so that the shooting equipment is automatically restored to the normal state of use.

It is noted that the sighting device 10 issues the shoot-locking instruction, only when it is determined that a human target is currently being aimed at, or only when it is determined that there is currently target tracking of a human target, or when the conditions of the human target currently being aimed at and the existence of target tracking of the human target are both met.

Figure 17:
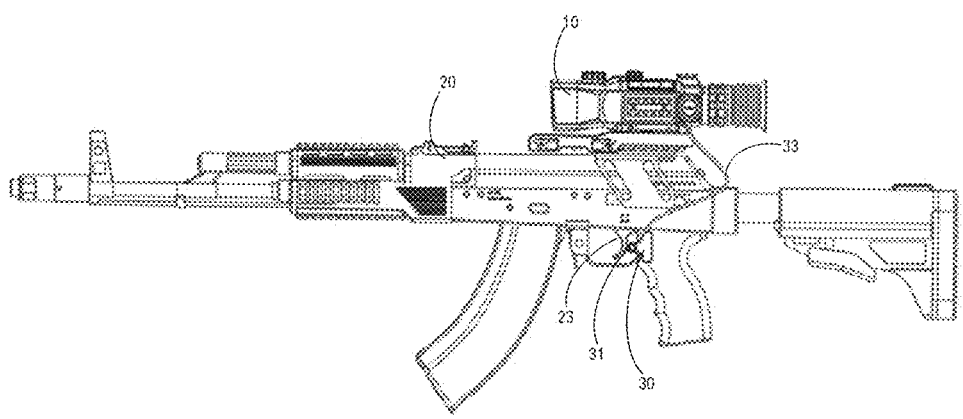
FIG. 17 shows a gun-sight linked human detection and protection assembly mounted on shooting equipment according to one embodiment.

In some embodiments, the trigger locking member 30 is disposed on the shooting equipment 20 at a location proximate the trigger 23, and the trigger locking member 30 is communicatively coupled to the sighting device 10 in a wired communication manner or a wireless communication manner. In this embodiment, as shown in FIG. 17, the trigger locking member 30 and the sighting device 10 are connected via a type-c interface data line 33, and the use of the data line 33 is more conducive to ensuring the reliability of the communication between the trigger locking member 30 and the sighting device 10 in various complex environments. The trigger locking member 30 may include a movable locking portion 31, and the movable locking portion 31 may have various forms, for example, the locking portion 31 may be telescopically extensible to protrude into a space behind the trigger 23 to engage with the trigger 23, making the trigger 23 unable to move, or retractable from the space behind the trigger 23 to unlock the trigger 23, allowing the trigger 23 to be normally moved.

Figure 18:
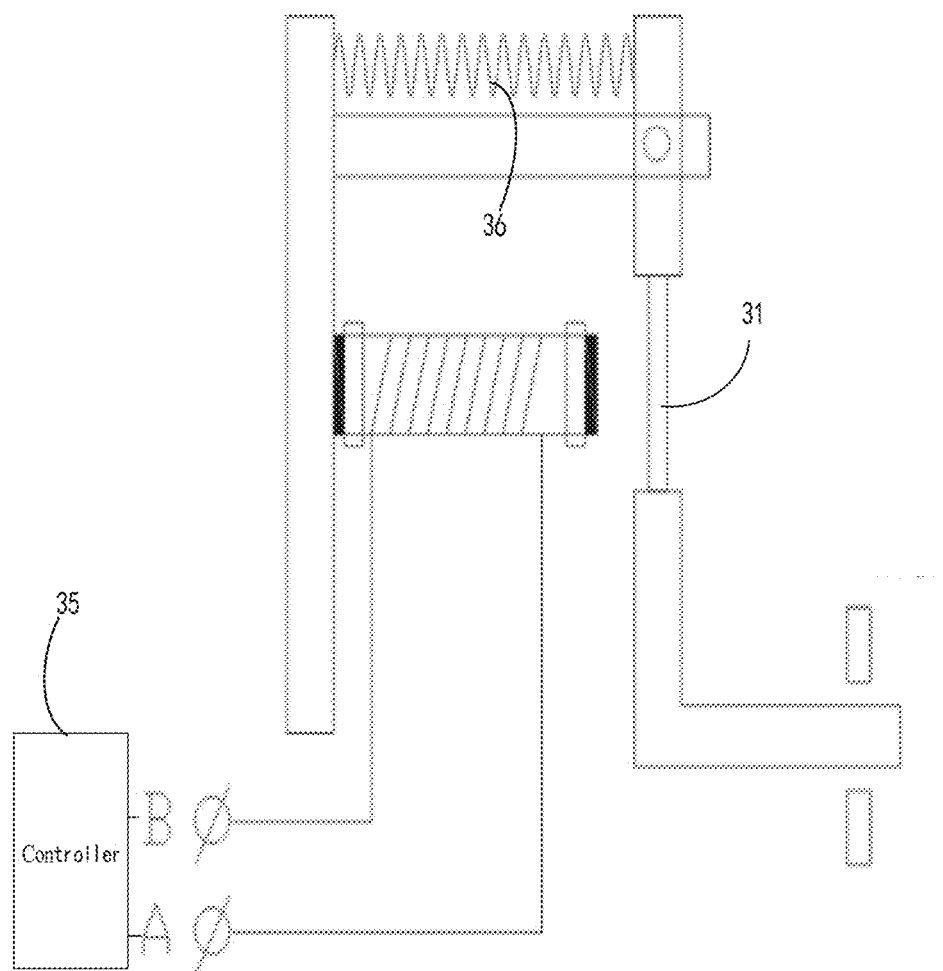
FIG. 18 shows a schematic diagram of a trigger locking member according to one embodiment.

FIG. 18 illustrates an exemplary structure of the trigger locking member 30. The trigger locking member 30 includes a locking portion 31, a controller 35, and a driving member 36. The controller 35 is communicatively connected to the sighting device 10, for receiving the shoot-locking instruction and then outputting a control signal to the driving member 36, controlling the driving member 36 to drive the locking portion 31 to lock the trigger 23 of the shooting equipment 20. The controller 35 can be implemented as an electronic control unit, and the driving member 36 may be one of various actuating elements controlled by the controller 35 to drive the locking portion 31 to move.

In another aspect, the present application provides a computer program product comprising a computer program, the computer program, when executed by a processor, implements the human detection and warning method in accordance with any of the forgoing embodiments of the present application.

Figure 19:
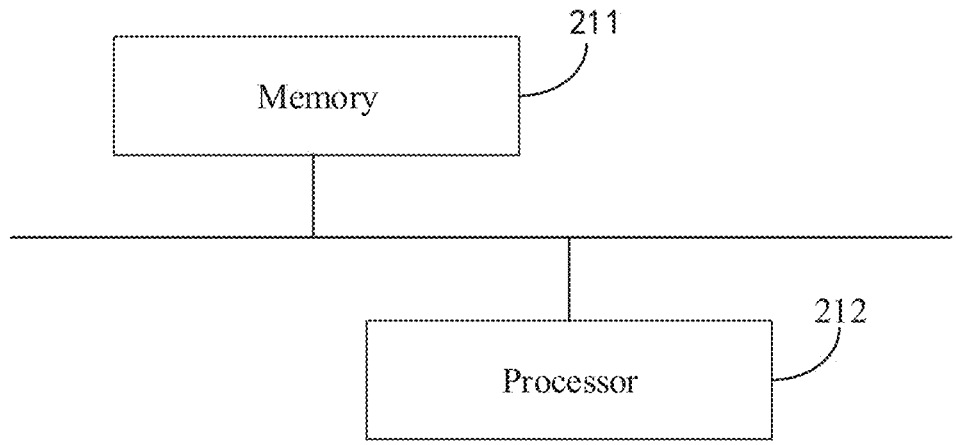
FIG. 19 is a schematic diagram of a human detection and warning device according to one embodiment.

In another aspect, the present application provides a human detection and warning device, referring to FIG. 19 which illustrates an exemplary hardware structure of the human detection and warning device, the human detection and warning device includes a processor 211 and a memory 212 coupled to the processor 211. The memory 212 stores a computer program therein for realizing the human detection and warning method provided in any embodiment of the present application, so that the computer program, when executed by the processor, implements the steps of the human detection and warning method provided in any embodiment of the present application. The human detection and warning device loaded with the corresponding computer program has the same technical effect as the corresponding embodiment of the method, explanation of which is not repeated herein.

Figure 20:
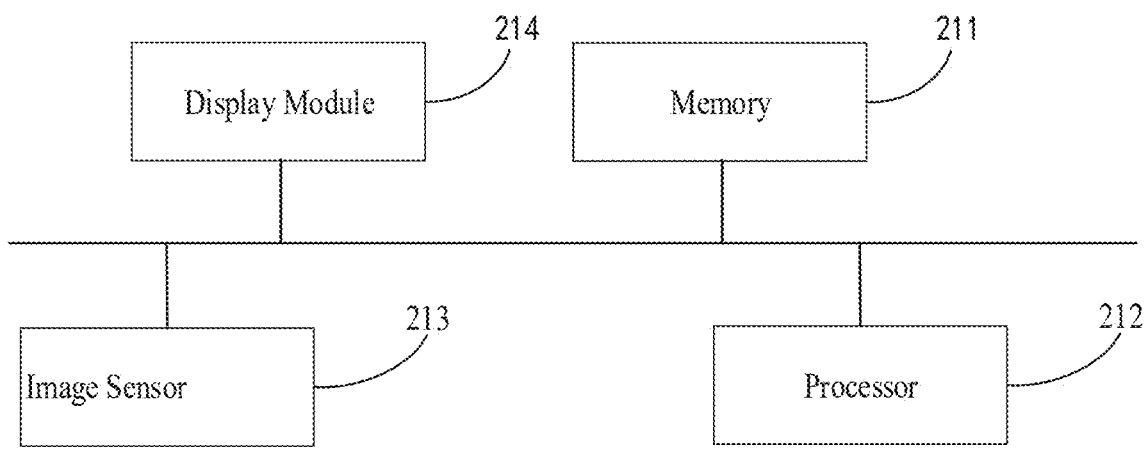
FIG. 20 is a schematic diagram of a sighting device according to one embodiment.

Optionally, the application example of the human detection and warning device may be the sighting device, i.e., the memory and the processor of the human detection and warning device may be integrated in the sighting device. Referring to FIG. 20, the sighting device further includes an image sensor 213 for capturing a current scene image within a current field of view, and sending the current scene image to the processor 211 and a display module 214. The display module 214 is configured to display information under the current aiming mode, mainly displaying the current scene image and the aiming mark. Specifically, under the normal aiming mode, the display module 214 displays the current scene image, various target recognition results, the aiming mark and the like. In the abnormal aiming mode, the display module 214 displays various specified graphic alerts, a jittery display screen, a black screen, a splash screen, offsetting or disappearing of the aiming mark offset or disappearing, and the like.

In still another aspect, the present application further provides a computer-readable storage medium with a computer program stored thereon, the computer program being executable by a processor to realize the process of each of the above embodiments of the human detection and warning method, which can achieve the same technical effect, explanation of which is not repeated herein. The computer-readable storage medium may be a read-only memory (ROM), a random-access memory (RAM), a magnetic disk, or a CD-ROM.

It should be noted that in this disclosure, the terms "including", "comprising", or any other variations thereof, are intended to cover non-exclusive inclusion, so that a process, method, article of manufacture, or apparatus comprising a set of elements includes not only those elements listed but also other elements that are not expressly listed or that are inherent to such process, method, article or apparatus. Without further limitation, the fact that an element is defined by the phrase "including a . . ." does not exclude the existence of another same element in the process, method, article of manufacture, or device that includes that element.

By the above description of the embodiments, it is clear to people skilled in the art that the method of the above embodiments can be realized by means of software in combination with the necessary general hardware platform, or by means of hardware, but in many cases the former is the preferred implementing manner. Based on this understanding, the technical solution of the present application may be embodied essentially in the form of a computer software product, which is stored on a storage medium (e.g., ROM/RAM, magnetic disk, CD-ROM), including a number of instructions for enabling a terminal (e.g., a mobile phone, a computer, a server, an infrared thermal imager or a network device, etc.) to carry out the method described in the various embodiments of the present invention.

The foregoing are only specific embodiments of the present disclosure, but the scope of the present disclosure is not limited thereto. Various changes or substitutions that may be readily conceivable by those skilled in the art within the scope of the technology disclosed in the present disclosure shall fall into the scope of the present disclosure. Therefore, the scope of the present disclosure shall be determined based on the appended claims.

What is claimed is:

1. A human detection and warning method comprising:
   acquiring a current scene image within a current field of view of a sighting device;
   determining whether there is a human target being currently aimed at based on a target recognition result of the current scene image and a position of an aiming mark in the current scene image; and
   triggering the sighting device to enter an abnormal aiming mode if there is a human target being currently aimed at;
   wherein determining whether there is a human target being currently aimed at based on the target recognition result of the current scene image and the position of the aiming mark, comprises:
   performing target recognition with respect to the current scene image to determine a human target contained in the current scene image and mark the human target:
   determining the position of the aiming mark in the current scene image;
   determining whether the human target is currently being aimed at based on a position of a marking of the human target being marked and the position of the aiming mark in the current scene image;
   or,
   determining a position of the aiming mark in the current scene image, and performing target recognition with respect to a predetermined area image corresponding to the position of the aiming mark;
   determining, based on the target recognition with respect to the predetermined area image, whether there is a human target present within the predetermined area image corresponding to the position of the aiming mark to determine whether there is a human target being currently aimed at.

2. The human detection and warning method according to claim 1, wherein marking the human target comprises:
   displaying a target frame at a periphery of the human target; and/or
   highlighting an outline or an image area of the human target, the way of highlighting comprising at least one of the following: highlighting in specified color, outlined highlighting, highlighting with higher brightness.

3. The human detection warning method according to claim 1, wherein the target recognition is a deep learning-based target recognition method, comprises:
   utilizing a target detection model to determine whether there is a target present in the current scene image,
   if a target exists in the current scene image, extracting features of the current target using a feature extraction model to obtain a target feature vector of the current target; and
   comparing the target feature vector with a human feature vector in a human feature vector database to determine whether the current target is a human target, wherein the human feature vector has been obtained by inputting a sample image containing a human target into the feature extraction model.

4. The human detection and warning method according to claim 3, wherein comparing the target feature vector with a human feature vector in a human feature vector database to determine whether the current target is a human target comprises calculating a distance between the target feature vector and each of the human feature vectors in the human feature vector database, and determining whether the current target is a human target based on the distance.

5. The human detection and warning method according to claim 1, wherein the abnormal aiming mode comprises at least one of the following:
   providing a warning notice, the warning notice comprising at least one of an audible warning, a light warning, a graphic warning on a display screen, and a target highlighting warning;
   providing an abnormal display warning, the abnormal display comprising at least one of disappearing of an aiming mark, offsetting of an aiming mark, a black screen, a splash screen, and jittering of a display screen;
   shutdown of a system;
   providing a warning notice and starting a timer, and providing an abnormal display warning or shutting down the system if the accumulated time of the timer reaches a threshold and there is still a human target being currently aimed at.

6. The human detection and warning method according to claim 1, further comprising:
   maintaining or restoring a normal aiming mode of the sighting device if there is no human target being currently aimed at; or
   resuming a normal aiming mode if a control instruction to manually revoke the abnormal aiming mode is received.

7. The human detection and warning method according to claim 1, wherein the current scene image is one of an infrared image, a visible light image, a micro-light image, and a multi-light fusion image.

8. A sighting device comprising:
   a memory for storing a computer program therein;

a processor configured to execute the computer program to implement a human detection and warning method according to claim 1;

an image sensor configured to capture a current scene image within a current field of view; and a display module configured to display the current scene image and the aiming mark.

9. The sighting device according to claim 8, wherein the target recognition is a deep learning-based target recognition method, comprises:

utilizing a target detection model to determine whether there is a target present in the current scene image;

if a target exists in the current scene image, extracting features of the current target using a feature extraction model to obtain a target feature vector of the current target; and comparing the target feature vector with a human feature vector in a human feature vector database to determine whether the current target is a human target, wherein the human feature vector has been obtained by inputting a sample image containing a human target into the feature extraction model.

10. A computer-readable storage medium having a computer program stored thereon, the computer program being executable by a processor to implement a human detection and warning method according to claim 1.

* * * * *